United States Patent
Tao

(10) Patent No.: US 11,985,052 B2
(45) Date of Patent: May 14, 2024

(54) METHOD, APPARATUS AND SYSTEM FOR MONITORING NETWORK CONNECTIVITY STATUS OF NETWORK DEVICE

(71) Applicant: ALIBABA GROUP HOLDING LIMITED, Grand Cayman (KY)

(72) Inventor: Zhen Tao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 44 days.

(21) Appl. No.: 16/262,842

(22) Filed: Jan. 30, 2019

(65) Prior Publication Data
US 2019/0238435 A1    Aug. 1, 2019

(30) Foreign Application Priority Data

Jan. 30, 2018   (CN) .......................... 201810091880.6

(51) Int. Cl.
*H04L 43/0811*   (2022.01)
*H04L 41/0853*   (2022.01)
(Continued)

(52) U.S. Cl.
CPC ...... *H04L 43/0811* (2013.01); *H04L 41/0853* (2013.01); *H04W 24/08* (2013.01); *H04W 84/12* (2013.01)

(58) Field of Classification Search
CPC . H04L 41/06; H04L 41/0654; H04L 43/0817; H04L 43/0811
See application file for complete search history.

(56) References Cited

U.S. PATENT DOCUMENTS

| 8,392,401 B1 | 3/2013 | Aly et al. |
| 2006/0239208 A1 | 10/2006 | Roberts et al. |
| (Continued) | | |

FOREIGN PATENT DOCUMENTS

| CN | 101288063 A | 10/2008 |
| CN | 104601402 A | 5/2015 |
| (Continued) | | |

OTHER PUBLICATIONS

PCT International Search Report and Written Opinion dated Apr. 29, 2019, issued in corresponding International Application No. PCT/US2019/015926 (23 pgs.).

(Continued)

*Primary Examiner* — Jason E Mattis
*Assistant Examiner* — Bao G Nguyen
(74) *Attorney, Agent, or Firm* — Finnegan, Henderson, Farabow, Garrett & Dunner, LLP

(57) ABSTRACT

The present disclosure provides methods, apparatuses and systems for monitoring a network connectivity status of an enrollee device. According to one exemplary method, a configurator device acquires at least one channel. The configurator device sends a request packet to the enrollee device using the at least one channel. The request packet can include at least one of: a first request packet for querying whether the enrollee device is connected to a hotspot, a second request packet for querying whether there is a network failure in the enrollee device, or a third request packet for querying a hotspot list of all hotspots found by the enrollee device. The configurator device can acquire network information of the enrollee device according to a corresponding reply packet returned by the enrollee device. Accordingly, a user can determine whether an enrollee device is connected to a network, and the connectivity status of the enrollee device.

23 Claims, 17 Drawing Sheets

(51) Int. Cl.
*H04W 24/08* (2009.01)
*H04W 84/12* (2009.01)

(56) References Cited

U.S. PATENT DOCUMENTS

| | | | |
|---|---|---|---|
| 2010/0122084 A1 | 5/2010 | Liu | |
| 2013/0167196 A1 | 6/2013 | Spencer et al. | |
| 2013/0170482 A1* | 7/2013 | Jung | H04W 8/005 |
| | | | 370/338 |
| 2014/0066090 A1* | 3/2014 | Henderson | H04W 4/021 |
| | | | 455/456.1 |
| 2014/0068719 A1 | 3/2014 | Kiukkonen et al. | |
| 2014/0226487 A1* | 8/2014 | Forssell | H04W 36/22 |
| | | | 370/235 |
| 2014/0365652 A1 | 12/2014 | Pauley | |
| 2014/0376405 A1* | 12/2014 | Erickson | H04L 9/32 |
| | | | 370/254 |
| 2015/0223095 A1* | 8/2015 | Centonza | H04W 52/365 |
| | | | 455/67.11 |
| 2016/0183103 A1* | 6/2016 | Saily | H04W 36/02 |
| | | | 370/216 |
| 2016/0249395 A1* | 8/2016 | Logue | H04L 12/2803 |
| 2016/0277370 A1* | 9/2016 | Lee | H04W 12/35 |
| 2016/0353360 A1* | 12/2016 | Lee | H04L 41/06 |
| 2017/0061131 A1 | 3/2017 | Santos et al. | |
| 2017/0164221 A1* | 6/2017 | Tan Bergstrom | H04W 8/02 |
| 2017/0181047 A1* | 6/2017 | Cai | H04W 36/03 |
| 2017/0215122 A1* | 7/2017 | Nigam | H04L 45/74 |
| 2017/0238354 A1* | 8/2017 | Fujita | H04W 84/12 |
| | | | 370/329 |
| 2017/0339734 A1* | 11/2017 | Sambe | H04W 76/15 |
| 2018/0213461 A1* | 7/2018 | Grayson | H04L 43/0882 |
| 2019/0098627 A1* | 3/2019 | Tamura | H04W 48/16 |

FOREIGN PATENT DOCUMENTS

| | | |
|---|---|---|
| CN | 106255177 A | 12/2016 |
| CN | 106358147 A | 1/2017 |
| WO | WO 2019/152568 A1 | 8/2019 |

OTHER PUBLICATIONS

First Search Report issued in corresponding Chinese Application No. 201810091880.6 dated Nov. 17, 2021 (1 page).

* cited by examiner

METHOD, APPARATUS AND SYSTEM FOR MONITORING NETWORK CONNECTIVITY STATUS OF NETWORK DEVICE

CROSS-REFERENCE TO RELATED APPLICATION

The present disclosure claims the benefits of priority to Chinese Patent Application 201810091880.6, filed on Jan. 30, 2018, which is incorporated herein by reference in its entirety.

TECHNICAL FIELD

The present disclosure generally relates to the field of communications, and in particular, to methods, apparatuses and systems for monitoring a network connectivity status of a network device.

BACKGROUND

With the rapid development of communication technologies, wireless local area networks (WLANs) that follow the IEEE802.11 standard are widely used in a variety of devices. Some of the devices have a screen (display screen), for example, smart terminal devices such as mobile phones and computers. Some devices do not have a screen component, for example, Internet of Things (IoT) devices such as smart air conditioners and smart electric cookers.

Typically, before a WLAN IoT device is used, its WLAN network needs to be configured. These WLAN IoT devices may encounter different types of failures when connecting with WLAN hotspots, such as mismatching of passwords, mismatching of WLAN standards, mismatching of encryption methods, and so on. These events may cause connection failures. For those IoT devices without screens, there is no user-friendly display interface. A user cannot quickly and conveniently know whether a network device is successfully connected to the Internet, where a failure occurs, and so on.

At present, there is no effective solution to the foregoing problems that a user cannot determine whether a network device is successfully connected to a network, during the process of connecting the device to the network. Further, a user cannot determine the network connectivity status of the network device that has been connected to the network.

SUMMARY

Embodiments of the present disclosure provide methods, apparatuses and systems for monitoring a network connectivity status of a network device. The embodiments of the present disclosure address the technical problems that a user cannot determine whether a network device is successfully connected to a network and cannot monitor a network connectivity status of the network device in the process of connecting the network device to the network.

According to some embodiments of the present disclosure, methods for monitoring a network connectivity status of a network device are provided. According to one exemplary method, a network configurator device acquires at least one channel. The network configurator device sends a request packet to the network device by using the at least one channel. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The network configurator device acquires network information of the network device according to a reply packet when the reply packet is received. The network device feeds back the corresponding reply packet according to the request packet.

According to some embodiments of the present disclosure, methods for monitoring a network connectivity status of a network device are further provided. According to one exemplary method, a network configurator device acquires at least one channel. The network configurator device receives a reply packet returned by the network device by using any one or more initial channels and acquires network information of the network device according to the reply packet. The network device feeds back the reply packet according to a request packet sent by the network configurator device. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

According to some embodiments of the present disclosure, methods for monitoring a network connectivity status of a network device are further provided. According to one exemplary method, a network configurator device acquires at least one channel. The network configurator device sends a request packet to the network device by using any one or more initial channels. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The network configurator device acquires network information of the network device according to a reply packet when the reply packet is received. The network device feeds back the corresponding reply packet according to the request packet.

According to some embodiments of the present disclosure, systems for monitoring a network connectivity status of a network device are provided. One exemplary system includes a network device; a network access device through which the network device is connected to a network; and a network configurator device located between the network device and the network access device. The network configurator device can be used to acquire at least one channel. After receiving a reply packet returned by the network device by using any one or more initial channels, the network configurator device acquires network information of the network device according to the reply packet. The network device feeds back the reply packet according to the request packet sent by the network configurator device. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

According to some embodiments of the present disclosure, systems for monitoring a network connectivity status of a network device are further provided. One exemplary system includes: a network device; a network access device through which the network device is connected to a network; and a network configurator device located between the network device and the network access device. The network configurator device can be used to acquire at least one channel. After sending a request packet to the network device by using any one or more initial channels, the network configurator device acquires network information of the network device according to a reply packet if the reply packet is received. The network device feeds back the reply packet according to the request packet sent by the network configurator device. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

According to some embodiments of the present disclosure, apparatuses for monitoring a network connectivity status of a network device are further provided. One exemplary apparatus includes a first acquiring module used to acquire at least one channel; a first sending module configured to send a request packet to the network device by using the at least one channel; and a second acquiring module. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The second acquiring module can be used to acquire network information of the network device according to a reply packet when the reply packet is received, wherein the network device feeds back the corresponding reply packet according to the request packet.

According to some embodiments of the present disclosure, apparatuses for monitoring a network connectivity status of a network device are further provided. One exemplary apparatus includes: an acquiring module used to acquire at least one channel; and an receiving module used to receive a reply packet returned by the network device by using any one or more initial channels, and acquire network information of the network device according to the reply packet. The network device feeds back the reply packet according to a request packet sent by the network configurator device. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

According to some embodiments of the present disclosure, apparatuses for monitoring a network connectivity status of a network device are further provided. One exemplary apparatus includes: an acquiring module used to acquire at least one channel by using a network configurator device; a sending module used to send a request packet to the network device by using any one or more initial channels; and a determining module. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The determination module can be used to acquire network information of the network device according to a reply packet when the reply packet is received, wherein the network device feeds back the corresponding reply packet according to the request packet.

According to some embodiments of the present disclosure, methods for monitoring a network connectivity status of a network device are further provided. According to one exemplary method, the network device receives a request packet sent by a network configurator device by using at least one channel. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The network device returns a corresponding reply packet according to the request packet, wherein the reply packet includes network information of the network device.

According to some embodiments of the present disclosure, storage media are further provided. One exemplary storage medium includes a stored program which, when executed, causes a device to perform one or more of the foregoing methods for monitoring a network connectivity status of a network device as described above.

According to some embodiments of the present disclosure, computer terminals are further provided. One exemplary computer terminal includes a processor used to execute a program. When the program is executed, the processor performs one or more of the foregoing methods for monitoring a network connectivity status of a network device as described above.

According to some embodiments of the present disclosure, systems for monitoring a network connectivity status of a network device are further provided. One exemplary system includes: a processor; and a memory connected to the processor and used to provide the processor with instructions for performing methods for monitoring a network connectivity status of a network device. According to one exemplary method: a network configurator device acquires at least one channel. The network configurator device sends a request packet to a network device by using the at least one channel. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The network configurator device acquires network information of the network device according to a reply packet when the reply packet is received. The network device feeds back the corresponding reply packet according to the request packet.

According to some embodiments of the present disclosure, a network configurator device acquires at least one channel. The network configurator device sends a request packet to a network device by using the at least one channel. The request packet includes at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The network configurator device acquires network information of the network device according to a reply packet when the reply packet is received, wherein the network device feeds back the corresponding reply packet according to the request packet.

In view of the foregoing solutions, the network configurator device may send different request packets to the network device, which returns a corresponding reply packet. That way, the network configurator device can obtain and view network information of the network device in real time. For example, the user can have a clear understanding about whether a device is successfully connected to the network. The user can also monitor a network connectivity status of the network device that has been successfully connected to the network.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings.

DETAILED DESCRIPTION

Figure 1:
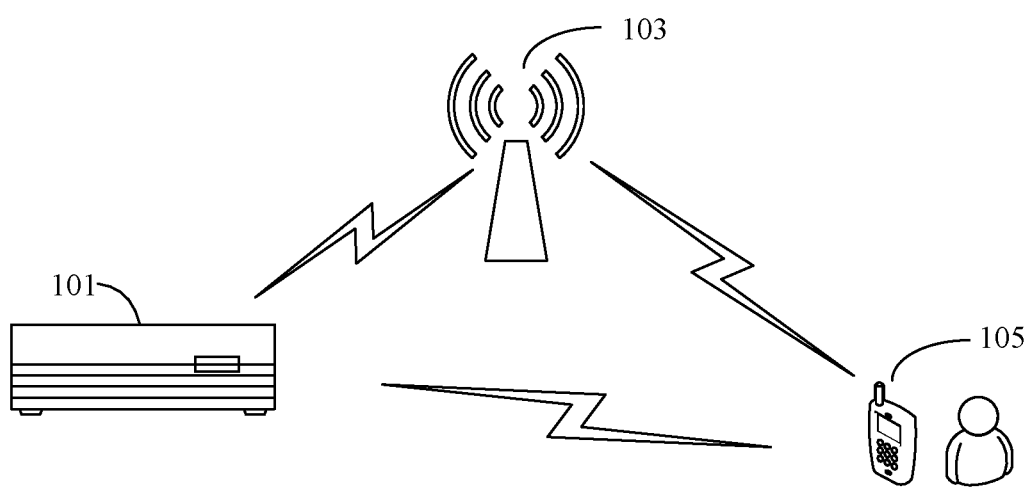
FIG. 1 is a schematic diagram of an exemplary system for monitoring a network connectivity status of a network device according to some embodiments of the present disclosure.

In order to facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

According to some embodiments of the present disclosure, systems for monitoring a network connectivity status of a network device are provided. Network devices can include devices for which the network needs to be configured, for example, one or more devices to be connected to a wireless local area network (WLAN) hotspot. Some system embodiments can be applied to various IoT devices that enable information exchange and communication via a WLAN (e.g., WiFi, etc.) in the IoT. For example, such devices can include computers, mobile phones, tablet computers, notebook computers, desktop computers, televisions and other intelligent terminal devices. They can also include refrigerators, washing machines, kitchen electrical appliances (induction cookers, microwave ovens, electric cookers, and range hoods), air conditioners, air purifiers, desk lamps and other intelligent household appliances.

WiFi is a technology that can wirelessly connect terminals such as personal computers and handheld devices (such as Pads and mobile phones) to each other. WiFi is a brand of the wireless network communications technology that is owned by the WiFi Alliance. One objective of WiFi technology is to improve interoperability between wireless network products based on the IEEE 802.11 standard. A local area network (LAN) using the IEEE 802.11 protocols can be referred to as WiFi. Compared with Bluetooth, the transmission distance of WiFi is not limited to just a few meters. For example, in an open area, the communication distance can be up to 305 meters. Even in a relatively closed area, the communication distance can also be up to 76 meters to 122 meters. This facilitates the integration with the existing wired Ethernet and reduces the networking cost. In addition, another advantage of WiFi is the high transmission speed, which can be up to 54 Mbps.

Compared with the wired networking mode used in the conventional smart home system, the application of WiFi technology can reduce the amount of network cabling and provide better scalability and mobility. Therefore, using WiFi and other WLAN technologies to connect household appliances is a viable option for the development of smart homes.

Taking an IoT air conditioner as an example, a WiFi module can be arranged on the air conditioner, so that wireless remote control can be achieved. The IoT air conditioner can be connected to the Internet using WiFi technology. A user can access the Internet using a mobile phone, a computer, a tablet computer, or the like, by means of GPRS/3G/WiFi. That way, the user can turn on the air conditioner in advance through a software application or web page. The user can enjoy a comfortable environment when he returns home. Another approach is Cloud access can also be applied. The air conditioner can be provided with a temperature sensor, a humidity sensor, and other sensors. Temperature and humidity information in a user's home can be periodically transmitted to a network server by using WiFi technology. The user can access the network server to check the environment status of his home in real time and control the operation of the air conditioner. In addition, the conventional remote control can be replaced with a terminal device such as a mobile phone, a computer, or a tablet computer. Taking the mobile phone as an example, when the mobile phone is connected to a home LAN, or the mobile phone is directly point-to-point connected to the air conditioning equipment, the operation of the air conditioner can be controlled by the mobile phone. By replacing the conventional remote control with an intelligent terminal device, the directional limitation of an infrared remote control can be avoided. That way, the user can control the air conditioner in any corner of his home, which improves the convenience and operability of the appliance.

With the popularity of the network technology, it is desirable to connect a variety of household appliances with network functions into a local area network by using a wireless technology. The local area network can then be connected to the external Internet, to construct a multi-functional modern intelligent home system.

Generally, when IoT devices are connected to the Internet, a WLAN network needs to be configured for each IoT device. However, many IoT devices do not have a display screen. The user does not know whether an IoT device is successfully connected to the Internet. Further, when there is a failure in the configuration of the WLAN network, the user is unable to quickly and easily discover what the failure is.

The WiFi Alliance formulated a network configuration standard, Device Provisioning Protocol (DPP). With this standard, a user can use, for example, a mobile phone, to transmit a DPP wireless signal frame to an enrollee device, which is to be connected to the network. The enrollee device can be connected to a corresponding WLAN hotspot according to information (WLAN ssid/key) of the WLAN network in the frame. The DPP standard sets forth the authentication and configuration processes of a network configurator device and an enrollee device. However, after the configuration process is complete, the network configurator device cannot know whether an enrollee device has been successfully connected. As further described below, one advantage of the embodiments provided in the present disclosure is to address the above problems.

A network configurator device can be used to configure a network. A network configurator device can include, but is not limited to, a mobile phone, a tablet computer, a notebook computer, a desktop computer and so on. For example, a network configurator device can configure a network of a hotspot to which one or more IoT devices can be connected. The network configurator device can acquire network information of the IoT devices, so as to determine whether a network device is successfully connected to the hotspot.

In some embodiments, network information can include the network information of a hotspot to which a network device is connected, including, but not limited to, network connectivity status information. For example, the network configurator device can send request packets to the network device. In some embodiments, a request packet can include a DPP action frame for acquiring network information (e.g., WLAN connectivity status information) of an IoT device. The request packet can include a DPP query request frame sent by the network configurator device to a network device to request querying a WLAN connectivity status of the network device. Different types of request packets can be used to query different types of network information. For example, requests packets can include, but are not limited to, a first request packet for querying whether the network device is successfully connected to a hotspot, a second request packet for querying whether there is a network failure in the network device that has been successfully connected to the hotspot, and a third request packet for querying a hotspot list of all hotspots found by the network device.

Based on different contents requested by request packets, network information of the network device included in reply packets returned by the network device can vary. For example, a reply packet can include a DPP action frame including network information (e.g., WLAN connectivity status information) of an IoT device. The reply packet can include a DPP query response frame sent by a network device to the network configurator device, to return WLAN connectivity status information to the network configurator device. According to the type of the request packet, the reply packet may return different types of information. For example, the reply packet can include identification information and network address information of a hotspot to which the network device is successfully connected can be returned according to the first request packet described above. A network connectivity status code for representing a network connectivity status and a network failure reason code can be returned according to the second request packet. A hotspot list of all hotspots found by the network device can be returned according to the third request packet.

Accordingly, if the configurator device can send a request packet for acquiring WLAN connectivity status information to an enrollee device such as an IoT device, and the enrollee device returns a corresponding reply packet, the user can obtain the network connectivity status of the enrollee device in real time through the configurator device (e.g., a mobile phone, a computer, etc.). That way, the user can know whether the network is configured successfully. Further, the user can also discover the reason for failure in case of failed network configuration, so that corresponding actions can be taken.

Based on the above application scenario, FIG. 1 is a schematic diagram of an exemplary system 100 for monitoring a network connectivity status of a network device according to some embodiments of the present disclosure. As shown in FIG. 1, the exemplary system 100 includes: a network device 101, a network access device 103, and a configurator device 105.

In some embodiments, network device 101 can be an enrollee device to be connected to a network, which includes, but is not limited to, an IoT device based on WLAN technology. For example, it can be a refrigerator, a washing machine, a kitchen electrical appliance (an induction cooker, a microwave oven, an electric cooker, or a range hood), an air conditioner, an air purifier, a desk lamp, or other intelligent household appliances.

Network device 101 can be connected to the network through network access device 103. In some embodiments, network access device 103 can be a hotspot device used to connect network device 101 to the network. For example, network device 103 can be a router, a gateway, or the like. It can also be an intelligent terminal device (e.g., a mobile phone, a computer, etc.) that provides a hotspot.

Configurator device 105 can be used to acquire at least one channel, send a request packet to network device 101 by using the at least one channel, and acquire network information of network device 101 according to a reply packet when the reply packet is received. Network device 101 can feed back the reply packet according to the request packet sent by configurator device 105. The request packet can include at least one of the following: a first request packet for querying whether network device 101 is successfully connected to a hotspot, a second request packet for querying whether there is a network failure in network device 101 that has been successfully connected to the hotspot, and a third request packet for querying a hotspot list of all hotspots found by network device 101. The hotspot information included in the hotspot list can be any of the following or a combination of several of the following: a hotspot that has been successfully connected to network device 101, at least one hotspot that can be connected to network device 101 but has not been connected to the network device 101 currently, and other hotspots found by the network device.

In some embodiments, configurator device 105 can include a terminal device used to determine whether one or more network devices to be connected to the network have been successfully connected to the network. For example, it can include, but is not limited to, a mobile phone, a tablet computer, a notebook computer, a desktop computer and so on.

It should be appreciated that configurator device 105 can send different request packets to network devices such as network device 101, to acquire network connectivity status information according to reply packets returned by network device 101. For example, configurator device 105 can send a first request packet to request viewing whether a network device is successfully connected to a hotspot. It can also send a second request packet to request viewing whether there is a network failure in a network device that has been successfully connected to the hotspot. Further, it can send a third request packet to request viewing all hotspots that can be found by a network device.

It is appreciated that the types of the request packets include, but are not limited to, the three types (i.e., the first request packet, the second request packet, and the third request packet) as described above. Other types of request packets can be set according to different specific application scenarios. For example, the request packet can be a request packet for viewing the network quality of the network device that has been successfully connected to the hotspot can be set. That way, the network device can switch to the network of another hotspot with a better network quality, if the network quality of the hotspot to which the network device is currently connected is poor.

Referring back to FIG. 1, in some embodiments, the first request packet can be used to request querying identification information of the hotspot to which network device 101 is successfully connected or a network address. The reply packet returned by network device 101 can include at least one of the following types of information: identification information of the hotspot to which network device 101 is successfully connected, and the network address information. The reply packet can be sent using an initial channel or a target channel. A target channel can refer to a channel for connecting network device 101 to a hotspot, that is, a channel used when network device 101 is successfully connected to the hotspot. An initial channel can refer to at least one preset channel. For example, an initial channel can be used to represent a default connection channel for sending DPP configuration frames to network device 101.

In some embodiments, the second request packet can be used to request querying network information of the hotspot to which network device 101 is successfully connected. The reply packet returned by network device 101 by using an initial channel or a target channel can include: a network connectivity status code for representing a network connectivity status. When there is a network failure, the reply packet can further include a reason code of the network failure in addition to the network connectivity status code.

In some embodiments, the third request packet can be used to request querying information of a list of all hotspots found by network device 101. The reply packet returned by network device 101 by using an initial channel or a target channel can include: a hotspot list of all the hotspots found by network device 101. The hotspot information included in the hotspot list can be any of the following or a combination of several of the following: a hotspot that has been successfully connected to network device 101, at least one hotspot that can be connected to network device 101 but has not been connected to network device 101 currently, and other hotspots found by network device 101. Further, the hotspot that has been successfully connected with network device 101 can be identified with certain identification information, or it can be displayed at the top of the hotspot list.

In some embodiments, the at least one channel acquired by configurator device 105 can include at least one of the following: a target channel and at least one initial channel. A target channel can refer to a channel used when network device 101 is successfully connected to a hotspot. Initial channels can refer to preset channels representing default connection channels for connecting network device 101 to the network. In some embodiments, when network device 101 is not yet connected to a hotspot, the initial channels can be used to send a request packet or receive a corresponding reply packet. When network device 101 is connected to a hotspot, the target channel can be used to send a request packet or receive a corresponding reply packet.

In the existing technology, in the process of a configurator device configuring a network for a network device, the configurator device sends a DPP frame to the network device to be configured, namely, the enrollee device. The network device can be connected to a corresponding hotspot according to network information included in the received DPP frame. After the configuration process ends, however, the configurator device is unable to know whether the enrollee device has been successfully connected to the network. Based on the embodiments of the present disclosure, the configurator device can further send to the network device a request packet for acquiring network information of the network device. That way, the configurator device can know whether the network device is successfully connected to the hotspot, according to the network information in a reply packet returned by the network device.

In view of the above description with reference to FIG. 1, in the process of connecting network device 101 to the network by using network access device 103, one or more channels for connecting network device 101 to the network can be acquired by configurator device 105. A request packet for requesting network information of network device 101 can be sent to network device 101 by using the acquired channel. Based on the sent request packet, it can be detected whether a corresponding reply packet is returned by network device 101. If the corresponding reply packet is received, the network information of network device 101 can be determined according to information included in the corresponding reply packet.

It is appreciated that the request packet sent by configurator device 105 includes, but is not limited to, a first request packet for requesting querying whether network device 101 is successfully connected to a hotspot, a second request packet for requesting querying network information of network device 101 that has been successfully connected to the hotspot, and a third request packet for requesting querying list information of all hotspots found by network device 101. Different types of network connectivity status information can be queried by sending different types of request packets. For example, a network configuration result of network device 101, information of all found hotspots, and a network failure that occurs after the hotspot is successfully connected and a reason of the failure.

Through the solutions provided by the foregoing embodiments of the present disclosure, different request packets can be sent to network device 101 by configurator device 105. That way, network information of network device 101 can be viewed in real time according to the reply packets returned by network device 101. Accordingly, a user can know whether a certain network device is successfully connected to the network, and a network connectivity status of a network device that has been successfully connected to the network.

It should be noted that in order to acquire the network information of network device 101, configurator device 105 needs to send to network device 101 a request packet for requesting acquisition of network information of network device 101. The network information of network device 101 can be determined according to a received reply packet that is returned by network device 101, which includes the network information of network device 101. In some embodiments, configurator device 105 can send the request packet and network device 101 can return the reply packet can be performed using, but not limited to, at least one of the following manners: (1) configurator device 105 sends the request packet by using an initial channel, and network device 101 returns the reply packet by using the initial channel; (2) configurator device 105 sends the request packet by using a target channel, and network device 101 returns the reply packet by using an initial channel; (3) configurator device 105 sends the request packet by using an initial channel, and network device 101 returns the reply packet by using a target channel; and (4) configurator device 105 sends the request packet by using a target channel, and network device 101 returns the reply packet by using the target channel.

It should be appreciated that the solutions of monitoring a network connectivity status of a network device provided in the above various embodiments can be combined with the existing DDP configuration procedures in actual implementation. They can also be used separately. In some embodiments, when the solutions are combined with DPP configuration, the request packet can include, for example, a query request frame for requesting acquisition of network information of a network device. The reply packet can include, for example, a query response frame that includes the network information of the network device. In some embodiments, the query request frame and the query response frame can be sent using a network configuration frame based on the DDP standard.

For example, when the network configuration frame based on the DPP standard is sent, the query request frame for sending a request packet (including, but not limited to, a first request packet, a second request packet and a third request packet) can be sent together with the network configuration frame based on the DPP standard. A query response frame corresponding to the query request frame can be received when the network configuration frame based on the DPP standard is received. For example, a reply packet to the second request packet can include a Status Code and a Reason Code which are defined in WiFi management frame standard. A Status Code can be used to indicate success or failure of a certain operation. A Reason Code can be sent when the network device is not suitable for joining the network.

In some embodiments, in the process that configurator device 105 sends a request packet to network device 101 by using at least one preset initial channel or a target channel, configurator device 105 sends a request packet sequentially on each channel of the at least one channel and determines whether a reply packet is received. If the reply packet is received, configurator device 105 stops sending the request packet on the next channel. Otherwise, configurator device 105 continues sending the request packet on the next channel of the at least one channel and determines whether a reply packet is received.

In some embodiments, configurator device 105 can be used to select a target channel or an initial channel by traversing one or more channels, and then switch to the selected target channel or preset initial channel to send a request packet. For example, when the selected channel is the target channel, configurator device 105 can switch to the target channel to send the request packet. When the selected channel is the initial channel, configurator device 105 can switch to the initial channel to send the request packet.

In some embodiments, after configurator device 105 sends the request packet for requesting acquisition of network information to network device 101 by using the channel (the target channel or the initial channel) selected by traversing each channel, network device 101 can return a reply packet by using the target channel or an initial channel.

It should be appreciated that whether configurator device 105 sends the request packet by using the target channel or sends the request packet by using the initial channel, configurator device 105 can receive a reply packet returned by network device 101 using the initial channel. Network device 101 may switch to the initial channel at any point.

In some embodiments, configurator device 105 may sequentially switch between the target channel and the initial channel to send the request packet. For example, when configurator device 105 sequentially switches between the target channel and the initial channel to send the request packet, network device 101 can return a reply packet by using the target channel or the initial channel. Further, network configurator device 105 can also receive a reply packet returned by the network device which switches to the initial channel.

In some embodiments, before configurator device 105 acquires the at least one channel, network device 101 can receive a network configuration frame sent by configurator device 105. If the network configuration frame is successfully received, network device 101 can acquire hotspot information from the network configuration frame and initiate a hotspot connection according to the hotspot information. When the hotspot connection is successful, network device 101 switches to the target channel and sends a reply packet to configurator device 105 by using the target channel. In some embodiments, when network device 101 fails to receive the network configuration frame or fails to connect with the hotspot, network device 101 can send a reply packet to configurator device 105 by using an initial channel.

It should be appreciated that if network device 101 does not receive the network configuration frame (or fails to receive the network configuration frame), the target channel may not exist. In addition, even if network device 101 receives the network configuration frame, the target channel may not exist because connection to the hotspot may fail due to other factors in the connection process. In those cases, network device 101 can send a reply packet to configurator device 105 by using an initial channel. That way, configurator device 105 can obtain network information of network device 101 according to the reply packet.

In some embodiments, before network device 101 receives the network configuration frame sent by configurator device 105, network device 101 can be further used to preset at least one initial channel.

According to some embodiments of the present disclosure, methods for monitoring a network connectivity status of a network device are further provided. The method embodiments provided herein can be applied to a system for monitoring a network connectivity status of a network device, such as the one described with reference to FIG. 1. It should be noted that the steps described herein or shown in the flowcharts of the accompanying drawings can also be performed in a computer system through a set of computer executable instructions. Further, although a sequence of the procedures may be shown in the flowcharts, the procedures described can be performed in an order different from the order described.

With the network configuration standard DPP, a user can use a terminal device such as a mobile phone to send a DPP wireless signal frame (that is, a network configuration frame) to an enrollee device, such as a network device to be connected to a network. The enrollee device can be connected to a corresponding WLAN hotspot according to WLAN information in the DPP wireless signal frame. However, only authentication and configuration processes of a configurator device and an enrollee device are formulated in the DPP standard. After the configuration process is complete, a configurator device cannot know whether the enrollee device has been successfully connected to the network. In other words, the network configuration sends a network configuration frame, the enrollee device can receive related hotspot information and connect to a target hotspot. However, there are situations where the enrollee device receives information, but cannot successfully connect to a target hotspot due to events such as an information error or a network failure. Further, the enrollee may not even receive the configuration frame.

Figure 2:
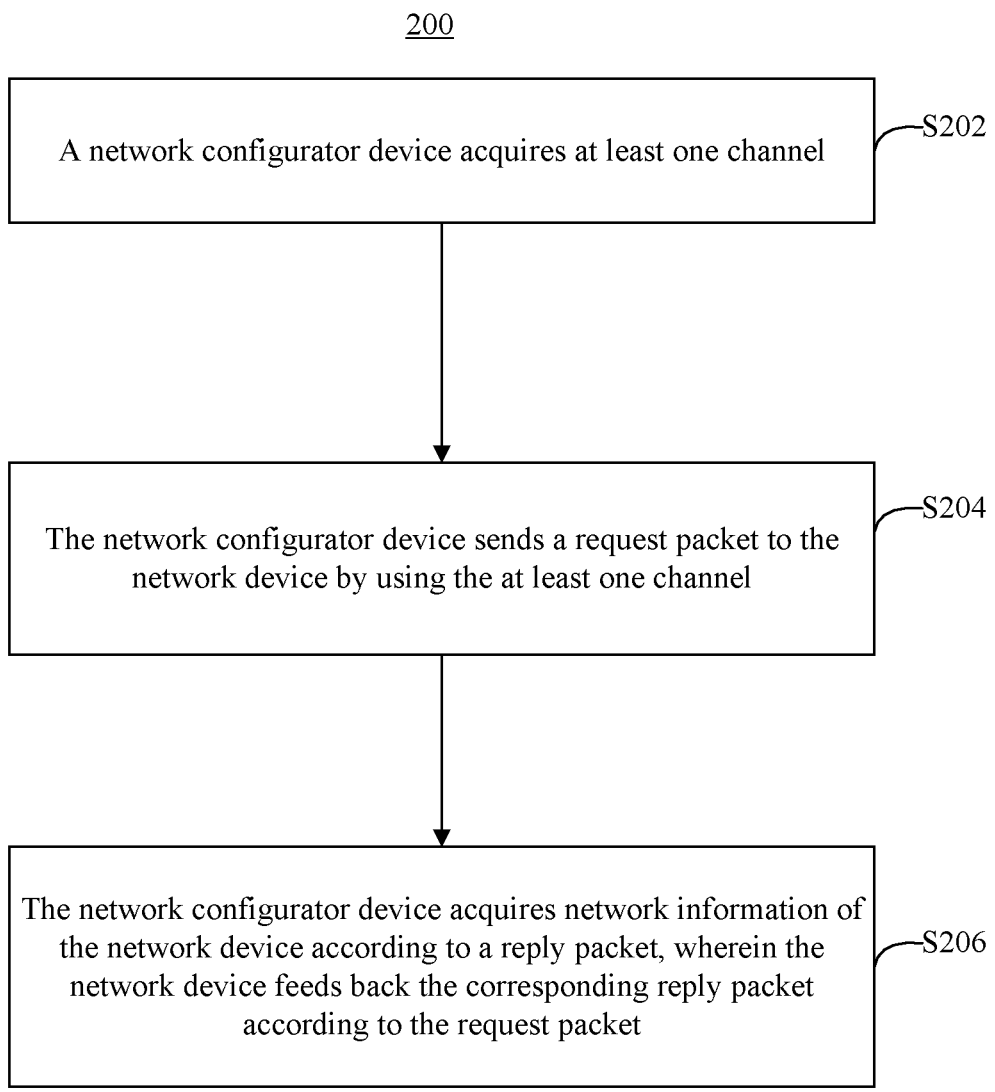
FIG. 2 is a flowchart of an exemplary method for monitoring a network connectivity status of a network device according to some embodiments of the present disclosure.

To solve the foregoing problems, the present disclosure provides methods for monitoring a network connectivity status of a network device. FIG. 2 is a flowchart of an exemplary method 200 for monitoring a network connectivity status of a network device according to some embodiments of the present disclosure. As shown in FIG. 2, the exemplary method 200 includes the following steps.

In step S202, a network configurator device (e.g., configuration device 105) acquires at least one channel. In some embodiments, the network configurator device can be a device used to perform network configuration for one or more network devices (e.g., network device 101) to be connected to a network. A network configurator device can be, but is not limited to, a mobile phone, a tablet computer, a notebook computer, a desktop computer, and so on. The at least one channel can be one or more pre-set initial channels, or a channel on which a hotspot works. The latter can include a channel that connects a network device to the hotspot, which can be referred to as a target channel.

In some embodiments, the configurator device can be used to configure one or more IoT devices based on a WLAN. The IoT devices may or may not have screens. For example, the IoT devices can include, but are not limited to, refrigerators, washing machines, kitchen electrical appliances (induction cookers, microwave ovens, electric cookers, and range hoods), air conditioners, air purifiers, desk lamps, and other intelligent household appliances.

In step S204, the network configurator device sends a request packet to the network device by using the at least one channel. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

In some embodiments, the network device can be a device to be connected to a network, which can include, but is not limited to, an IoT device based on a WLAN. The request packet may be a request data packet for requesting network information of the network device. The configurator device can use any initial channel or the target channel to monitor the request packet sent to the network device and detect whether a reply packet returned by the network device is received.

Figure 3:
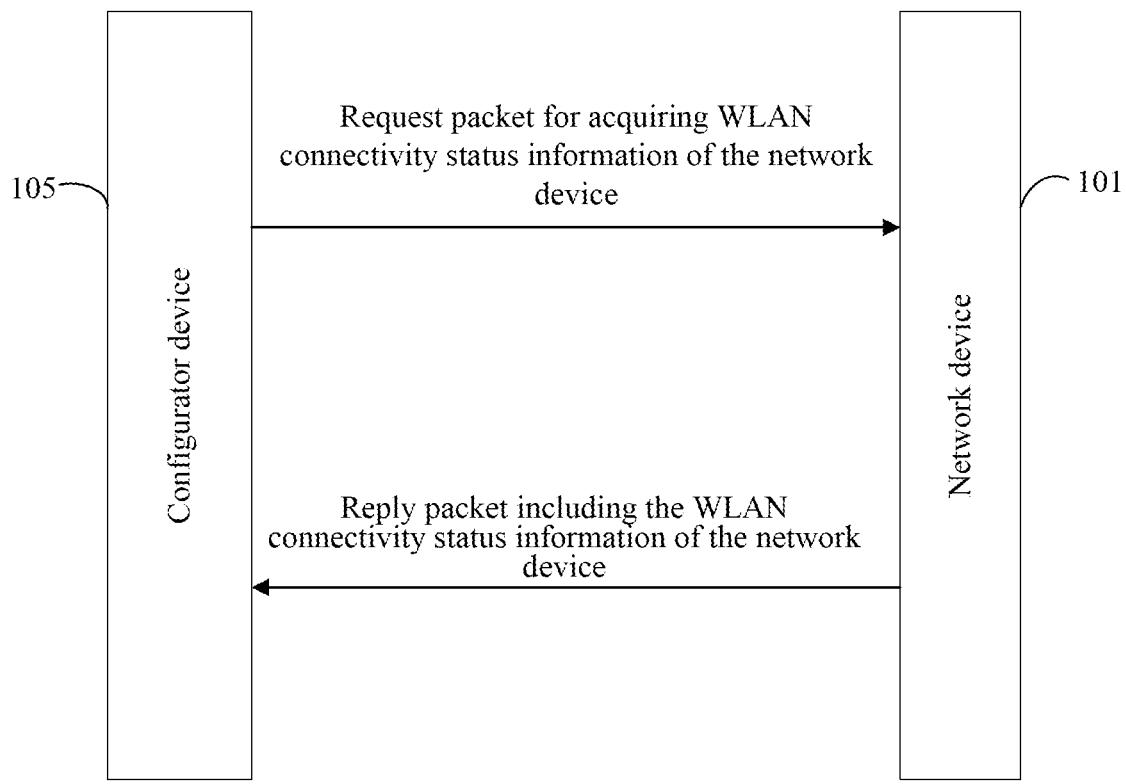
FIG. 3 is a schematic diagram illustrating exemplary interactions between a network configurator device and a network device according to some embodiments of the present disclosure.

FIG. 3 is a schematic diagram illustrating exemplary system interaction between a configurator device and a network device according to some embodiments of the present disclosure. As shown in FIG. 3, to enable configurator device 105 to know whether network device 101 is successfully connected to the network, configurator device 105 can send a request packet for acquiring WLAN network connectivity status information of network device 101. The request packet can be sent to network device 101 after configurator device 105 sends a network configuration frame to network device 101. If network device 101 is successfully connected to the network, network device 101 may return to configurator device 105 a reply packet including the WLAN network connectivity status information of the network device.

In some embodiments, the request packet and the reply packet can be sent based on a network configuration frame based on the DPP standard.

Referring back to FIG. 2, in step 206, the configurator device acquires network information of the network device according to a reply packet when the reply packet is received. The network device feeds back the corresponding reply packet according to the request packet.

In some embodiments, the network information can include, but is not limited to, WLAN network connectivity status information. The reply packet can be a response data packet that includes network information (e.g., WLAN network connectivity status information) of the network device. The reply packet can be returned by the network device, after the network device receives the request packet for acquiring the network information of the network device from the configurator device.

It should be appreciated that the network information can include not only WLAN network connectivity status information, but also WLAN network condition information. For example, the network condition information can include, but is not limited to, excellent, good, poor, or bad network conditions, and so on. Further, the network information can also include information regarding a failure reason when the network connection fails. For example, the failure can be due to reasons such as absence of a network configuration frame, an error in the network configuration frame, device outage, and so on.

In addition, it should also be appreciated that WLAN is only an example in the present description. The solutions disclosed in steps S202 to S206 can also be used to monitor connection of the network device to any one or more of the following networks: WLAN, Internet, Bluetooth, RFID, Zigbee, NFC, and so on.

In some embodiments, method 200 can further include step S208, in which the configurator device selects another channel when failing to receive a reply packet. The configurator device can continue to use the selected channel to monitor the request packet sent to the network device. In some embodiments, the request packet can include, for example, a query request frame for requesting acquisition of network information of the network device. The reply packet can include, for example, a query response frame that includes the network information of the network device.

Based on the foregoing description, the configurator device can acquire a target channel or at least one initial channel through which the network device can be connected to the network via a network access device. The configurator device can send, to the network device, a request packet for requesting network information of the network device by using the acquired channel. The configurator device can detect according to the sent request packet whether a corresponding reply packet returned by the network device is received. Based on the reply packet, the configurator device can determine the network information of the network device according to information included therein, when the corresponding reply packet is received.

It is appreciated that the request packet sent by the configurator device can include, but is not limited to, a first request packet for requesting querying whether the network device is successfully connected to a hotspot, a second request packet for requesting querying network connectivity status information of the network device that has been successfully connected to the hotspot, and a third request packet for requesting querying list information of all hotspots found by the network device. Different types of network connectivity status information can be queried by sending different types of request packets. For example, the status information can include a network configuration result of the network device, information of all found hotspots, and a network failure that exists after the hotspot is successfully connected and a reason of the failure.

In view of the foregoing solutions provided by the present disclosure, the network information of the network device can be viewed in real time using the configurator device. Therefore, a user can know whether an enrollee device is successfully connected to the network. Further, the user can monitor a network connectivity status of the enrollee device that has been connected to the network.

In some embodiments, if the request packet is the first request packet, the reply packet returned by the network device according to the request packet can include at least one of the following types of information: identification information of the hotspot to which the network device is successfully connected, and the associated network address information, routing information, domain name information, and network signal strength information. Accordingly, by sending the first request packet, a network configuration result of the network device can be viewed, such as whether the network device is successfully connected to a hotspot. Additionally, if the network device is successfully connected to a hotspot, more detailed information can be obtained. Such detailed information can include, but not limited to, identification information of the hotspot to which the network device is successfully connected, and the associated network address information, routing information, domain name information, network signal strength information, and so on.

In some embodiments, if the request packet is the second request packet, the reply packet returned by the network device according to the request packet can include, for example, at least one of the following types of information: a network connectivity status code and a reason code. Accordingly, by sending the second request packet, a network connectivity status of the network to which the network device is connected can be viewed. For example, a network failure code can further be displayed if there is a network failure.

In some embodiments, if the request packet is the third request packet, the reply packet returned by the network device according to the request packet can include, for example, at least one of the following types of information: a hotspot list of all hotspots found by the network device, access permission information of each hotspot included in the hotspot list, and the corresponding encryption type and network signal strength information.

It is appreciated that the hotspot information included in the hotspot list can be any of the following or a combination of several of the following: a hotspot that has been successfully connected to the network device, at least one hotspot that can be connected to the network device but has not been connected to the network device currently, and other hotspots found by the network device. In some embodiments, the hotspot that has been successfully connected to the network device can be identified with certain identification information or can be displayed at the top of the hotspot list. Accordingly, by sending the third request packet, information of the hotspot list of all hotspots that are found by the network device can be obtained. Further, detailed information such as access permission information (e.g., an authorization type) of each hotspot, whether encryption is performed, and network signal strength of each hotspot can also be obtained.

Figure 4:
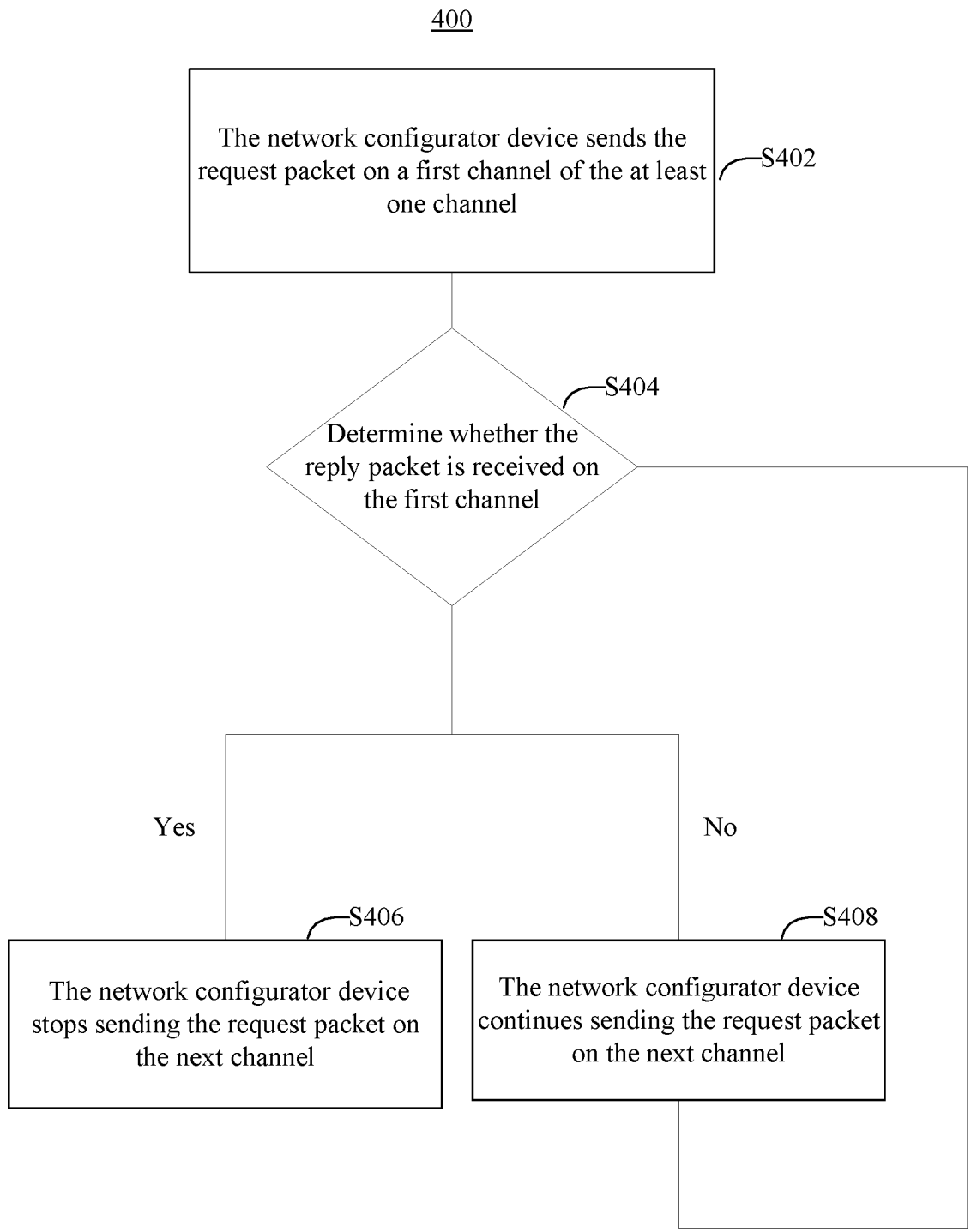
FIG. 4 is a flowchart of an exemplary method for monitoring a network connectivity status of a network device according to some embodiments of the present disclosure.

In some embodiments, the at least one channel can include at least one of the following: a target channel and at least one initial channel. The target channel can be a channel used when the network device is successfully connected to a hotspot. Initial channels can include preset channels representing default connection channels for connecting the network device to the network. The configurator device can use any initial channel or the target channel to monitor the request packet sent to the network device and detect whether a reply packet returned by the network device is received. As shown in FIG. 4, according to some embodiments, the process of the configurator device sending a request packet to a network device by using the at least one channel can include: the configurator device sends the request packet on each channel of the at least one channel sequentially and determines whether the reply packet is received. Specially, the exemplary process 400 as shown in FIG. 4 can include the following procedures:

In step S402: the network configurator device sends the request packet on a first channel of the at least one channel.

In step S404, the network configurator device determines whether a reply packet is received.

In step S406, if the reply packet is received, the configurator device stops sending the request packet on the next channel If the reply packet is not received, in step S408, the configurator device continues sending the request packet on the next channel of the at least one channel. The process returns to step 404, to determine whether the reply packet is received.

Based on the foregoing, the at least one channel can include a target channel and at least one initial channel. The target channel can be a channel used when the network device is successfully connected to a hotspot. The initial channel can include a preset channel representing a default connection channel for connecting the network to the network. The configurator device sends the request packet on each channel sequentially and determines whether the reply packet returned from the network device is received. The configurator device stops sending the request packet on the next channel if the reply packet fed back by the network device is received. If the reply packet is not received, the configurator device continues sending the request packet on the next channel.

For example, the channels acquired by the configurator device includes a target channel (represented with C) and n initial channels (respectively, $c_1, c_2, \ldots c_n$). In some embodiments, the configurator device can select one channel from the n+1 channels to send the request packet randomly. The configurator device can also select the one channel according to a preset rule. For example, the configurator device can send the request packet sequentially according to the order of the target channel and the initial channels.

In some embodiments, when sending the request packet sequentially according to the order of the target channel and the initial channels as an example for illustration, first of all, the configurator device can select the channel C to send the request packet. The configurator device can then monitor whether a reply packet from the network device is received. If the reply packet is received, the configurator device can stop sending the request packet. If no reply packet from the network device is received, the configurator device can continue to select the next channel (for example, channel $c_1$) to send the request packet. The configurator device can continue to monitor whether a reply packet from the network device is received. The process can be repeated until a reply packet from the network device is received. In some embodiments, if no reply packet from the network device is received after channel $c_n$ is selected to send the request packet, the configurator device can return to the first channel to send the request packet and monitor whether a reply packet from the network device is received.

Based on the foregoing solutions, the configurator device can send the request packet sequentially on each channel of the at least one channel. The configurator device can stop sending the request packet on the next channel when the reply packet returned from the network device is received. That way, consumption of the system resources can be reduced.

Figure 5:
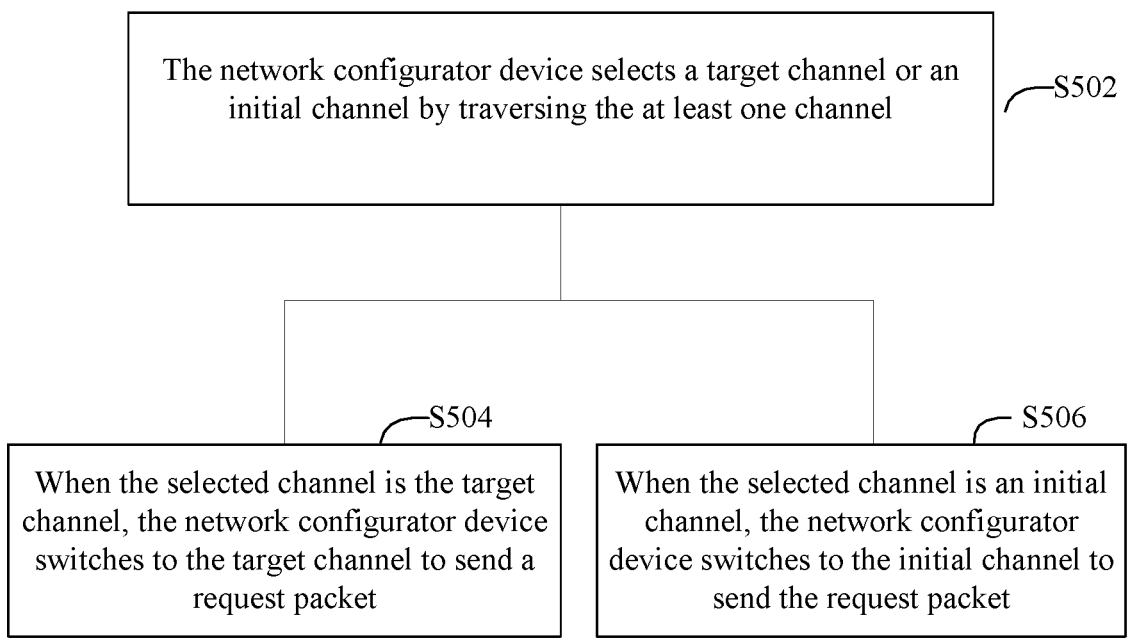
FIG. 5 is yet another flowchart of an exemplary method for monitoring a network connectivity status of a network device according to some embodiments of the present disclosure.

It should be appreciated that the configurator device can select a target channel or an initial channel by traversing the at least one channel, and then switch to the selected target channel or initial channel to send the request packet. For further description, as shown in FIG. 5, the exemplary method 500 can further include the following procedures.

In step S502, the configurator device selects a target channel or an initial channel by traversing the at least one channel.

In step S504, when the selected channel is the target channel, the configurator device switches to the target channel to send a request packet.

Alternatively, in step S506, when the selected channel is the initial channel, the configurator device switches to the initial channel to send the request packet.

Through the foregoing solution, the configurator device can send a request packet for requesting network information of the network device by using a target channel through which the network successfully connects to the network, or a preset initial channel.

It should be appreciated that whether the configurator device sends the request packet by using the target channel or an initial channel, the network device can switch to the initial channels to return a reply packet corresponding to the request packet. That is, the configurator device can receive a reply packet returned by the network device which may switch to the initial channels irregularly.

Figure 6:
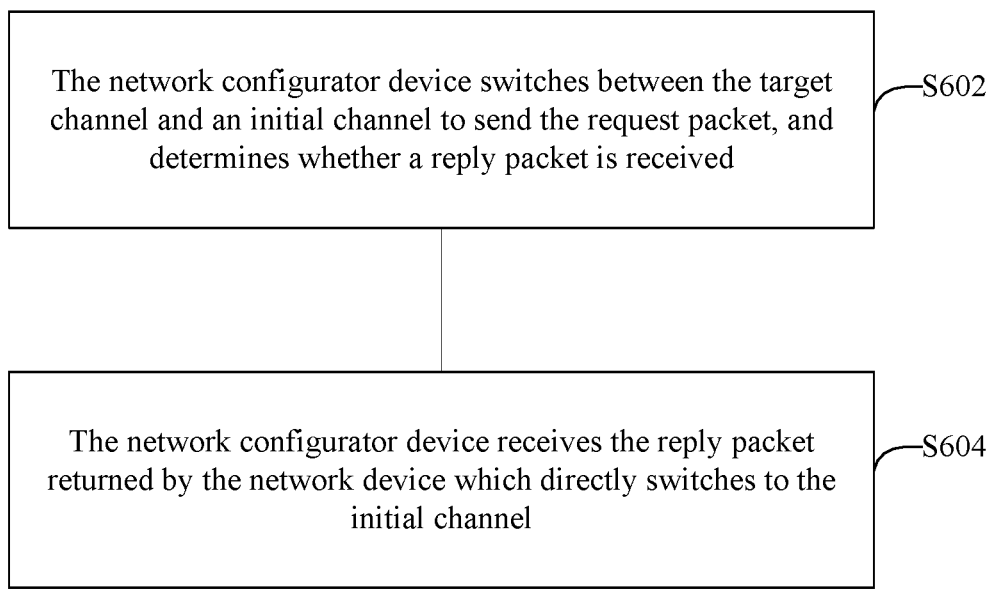
FIG. 6 is yet another flowchart of an exemplary method for monitoring a network connectivity status of a network device according to some embodiments of the present disclosure.

FIG. 6 illustrates another exemplary process 600 in which the configurator device sends a request packet to a network device by using the at least one channel. The exemplary process 600 can include the following procedures.

In step S602, the network configurator device switches between the target channel and an initial channel to send the request packet and determines whether the reply packet is received.

In step S604, the network configurator device receives the reply packet returned by the network device which switches to the initial channel.

Based on the foregoing solution, the configurator device can send the request packet to the network device by using a target channel or by a preset initial channel. After receiving the request packet, the network device can switch to the preset initial channel to return a corresponding reply packet to the configurator device. In some embodiments, the network device can directly switch to the initial channel irregularly to return the reply packet. That is, whether the configurator device sends the request packet by using the initial channel or the target channel, the configurator device can receive the reply packet from the network device by using the initial channel. The configurator device can then acquire network information of the network device according to the reply packet.

Based on the above embodiments, referring to the configurator device and the network device shown in FIG. 3, the implementation manners in which configurator device 105 sends a request packet and network device 101 returns a reply packet can include, but are not limited to, the following procedures.

In some embodiments, configurator device 105 sends a request packet for requesting acquisition of network information of the network device to network device 101 by using a preset initial channel. network device 101 returns a reply packet including the network information of the network device to configurator device 105 by using the initial channel.

In some embodiments, configurator device 105 sends a request packet for requesting acquisition of network information of the network device to network device 101 by using a target channel. network device 101 returns a reply packet including the network information of the network device to configurator device 105 by using an initial channel.

In some embodiments, configurator device 105 sends a request packet for requesting acquisition of network information of the network device to network device 101 by using a preset initial channel. Network device 101 returns a reply packet including the network information of the network device to configurator device 105 by using a target channel.

In some embodiments, configurator device 105 sends a request packet for requesting acquisition of network information of the network device to network device 101 by using a target channel. Network device 101 returns a reply packet including the network information of the network device to configurator device 105 by using the target channel.

In view of the foregoing, configurator device 105 can send a request packet to network device 101 by using any channel of the target channel and the preset initial channels, and network device 101 can also return a reply packet by using any channel of the target channel and the preset initial channels.

It is appreciated that if network device 101 has been connected to a hotspot, network device 101 may not stay in its preset initial channel. Network device 101 may switch to the target channel. The target channel can refer to a channel used when network device 101 is successfully connected to a hotspot. The initial channel can include a preset channel representing a default connection channel for connecting network device 101 to the network. Therefore, configurator device 105 may not only need to send and receive subsequent request packets on the preset initial channel, but also need to switch to a working channel of a target hotspot to send and receive subsequent information request packets.

In some embodiments, configurator device 105 can sequentially select a target channel and the at least one preset initial channel. The selected channels can be randomly selected. Configurator device 105 can sequentially switch between the target channel and each initial channel to send a request packet.

In some embodiments, when configurator device 105 switches sequentially between the target channel and each initial channel to send a request packet, network device 101 can return a reply packet by using the target channel or an initial channel. It should be appreciated here that when configurator device 105 switches between the target channel and the initial channels to send a request packet, network device 101 may directly switch to an initial channel to send a reply packet.

Based on the foregoing exemplary embodiments, configurator device 105 can send a request packet for requesting network information of network device 101 by using any one of the target channel and the initial channels.

Figure 7:
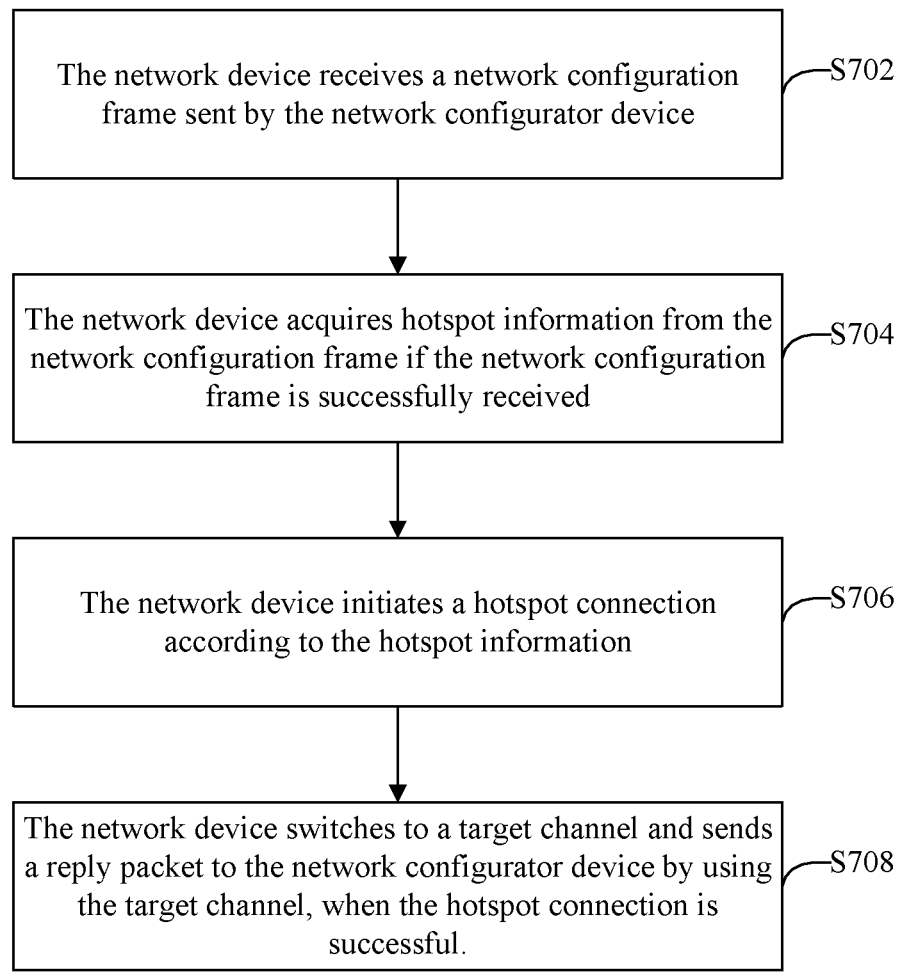
FIG. 7 is yet another flowchart of an exemplary method for monitoring a network connectivity status of a network device according to some embodiments of the present disclosure.

In some embodiments, as shown in FIG. 7, before the step of the configurator device acquiring at least one channel, the process can further include the following procedures:

In step S702, the network device receives a network configuration frame sent by the configurator device.

In step S704, the network device acquires hotspot information from the network configuration frame if the network configuration frame is successfully received.

In step S706, the network device initiates a hotspot connection according to the hotspot information.

In step S708, the network device switches to a target channel and sends a reply packet to the configurator device by using the target channel when the hotspot connection is successful.

According to the above procedures, the configurator device can be used to configure network information of a network device to be connected to a network. The hotspot information of a hotspot to which the network device is to be connected can be configured by sending a network configuration frame to the network device. Before the configurator device acquires at least one channel, the configurator device may send a network configuration frame for configuring hotspot information to the network device. After receiving the network configuration frame sent by the configurator device, the network device acquires, from the network configuration frame, the hotspot information of the hotspot to which the network device is to be connected. The network device can then initiate a hotspot connection according to the hotspot information. Accordingly, a hotspot network can be configured for a network device.

In some embodiments, the exemplary process 700 can further include the following procedures. In step S710, if the network device fails to receive the network configuration frame or the network device fails to connect to the hotspot, the network device sends a reply packet to the configurator device by using an initial channel.

In some embodiments, the network device may fail to receive the network configuration frame. In some cases, the network device may receive the network configuration frame but fail to be connected to the hotspot. In such situations, the network device can send a reply packet to the configurator device by using an initial channel.

In some embodiments, before the network device receives a network configuration frame sent by the configurator device, the exemplary process 700 can further include procedures where the network device presets at least one initial channel.

Figure 8:
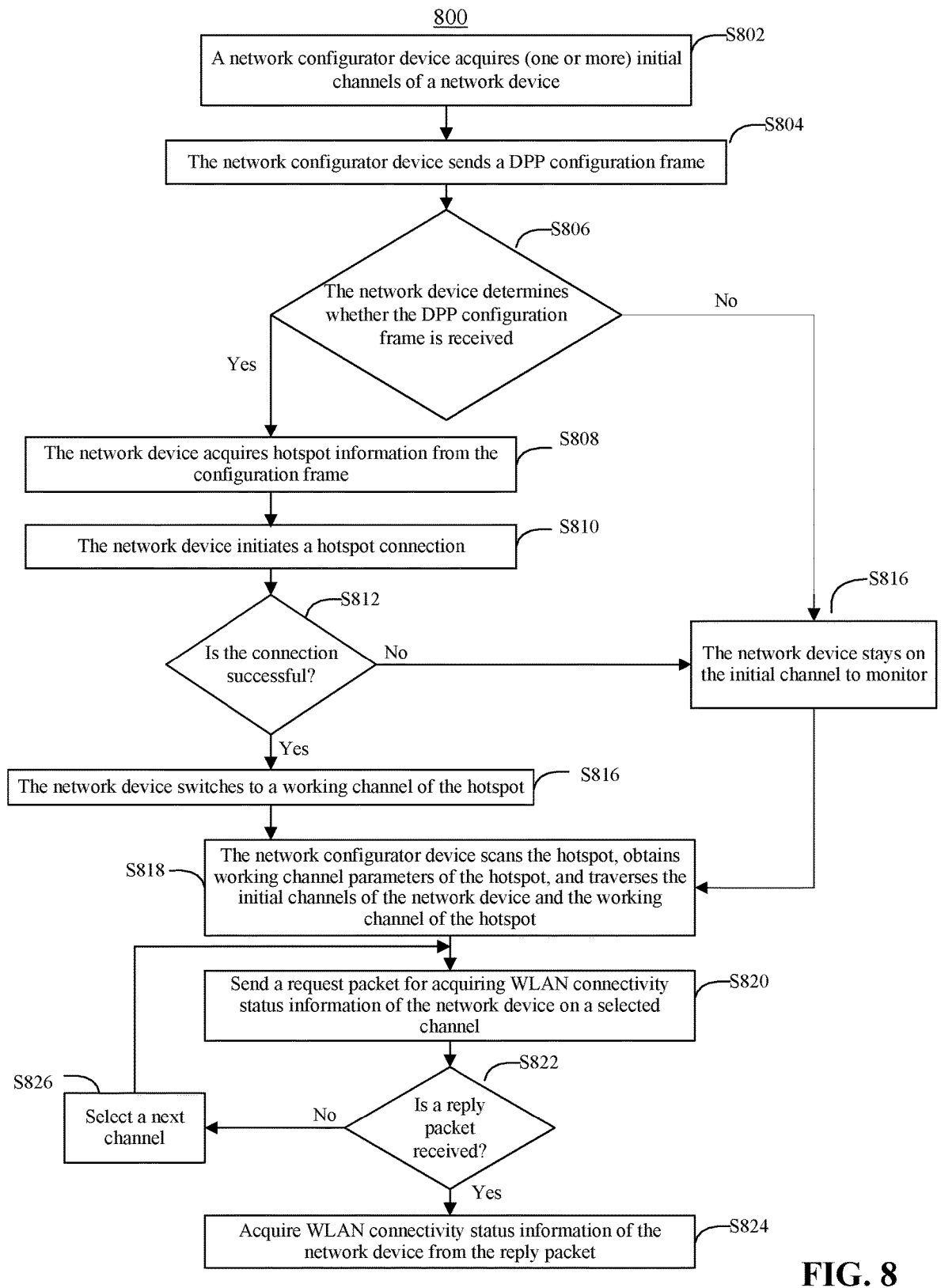
FIG. 8 is yet another flowchart of an exemplary method for monitoring a network connectivity status of a network device according to some embodiments of the present disclosure.

FIG. 8 illustrates a flowchart of an exemplary method for monitoring a network connectivity status of a network device according to some embodiments of the present disclosure. As shown FIG. 8, the exemplary method 800 can include steps S802-S824.

In step S802, a configurator device acquires (one or more) initial channels of a network device to be connected to a network, namely, a network device for which the network needs to be configured. That is, in the process of the configurator device configuring network setting of the network device to be connected to a network, the configurator device acquires one or more pre-configured initial channels.

In step S804, the configurator device sends a DPP configuration frame. That is, the configurator device sends a network configuration frame including hotspot information to the network device by using any of the initial channels.

In step S806, the network device determines whether the DPP configuration frame is received. After the network configuration frame is sent to the network device by using any of the initial channels, the network device determines whether the DPP configuration frame including hotspot information is received. If the DPP configuration frame including hotspot information is not received, step S816 is performed, where the network device stays on the initial channel to monitor.

If the DPP configuration frame including hotspot information is received, in step S808, the network device obtains hotspot information from the configuration frame. That is, after receiving the DPP configuration frame including hotspot information, the network device obtains hotspot information from the DPP configuration frame.

In step S810, the network device initiates a hotspot connection. According to the hotspot information obtained from the DPP configuration frame, the network device initiates the hotspot connection.

In step S812, it can be determined whether the hotspot connection is successful. That is, after the network device initiates a hotspot connection, it can be determined whether the network device is successfully connected to the hotspot.

If the network device is successfully connected to the hotspot, in step S814, the network device switches to a working channel of the hotspot. If the hotspot connection is not successful, step S816 is performed, where the network device stays on the initial channel to monitor.

In cases where the network device fails to receive the DPP configuration frame (step S806) or is not successfully connected to the hotspot (step S812), the network device monitors, on the initial channel, whether there is a request packet for requesting network information of the network device from the configurator device.

In step S818, the configurator device scans the hotspot, obtains working channel parameters of the hotspot, and traverses the initial channels of the network device and the working channel of the hotspot. The configurator device can, by scanning the hotspot, acquire working channel parameters of the hotspot, namely, channel parameters of a target channel as described above. Based on the acquired parameters, the configurator device can acquire the target channel. The configurator can then traverse the initial channels and the target channel to select one channel.

In step S820, a request packet for acquiring WLAN connectivity status information of the network device is sent on the selected channel. After selecting one channel from the at least one preset initial channel and the target channel, the configurator device uses the selected channel to send a request packet to the network device, for acquiring WLAN connectivity status information.

In step S822, it can be determined whether a reply packet is received. That is, after sending the request packet for requesting WLAN connectivity status information of the network device, the configurator device can determine whether a reply packet from the network device is received. If the reply packet from the network device is received, step S824 can be performed. In step 824, the WLAN connectivity status information of the network device can be acquired from the reply packet.

If the reply packet is not received, the process proceeds to step S826. In step 826, the configurator device selects the next channel, and the process returns to step S820. That is, if no reply packet from the network device is received, the configurator device selects the next channel to send a request packet. The process can repeat until a reply packet from the network device is received.

Figure 9:
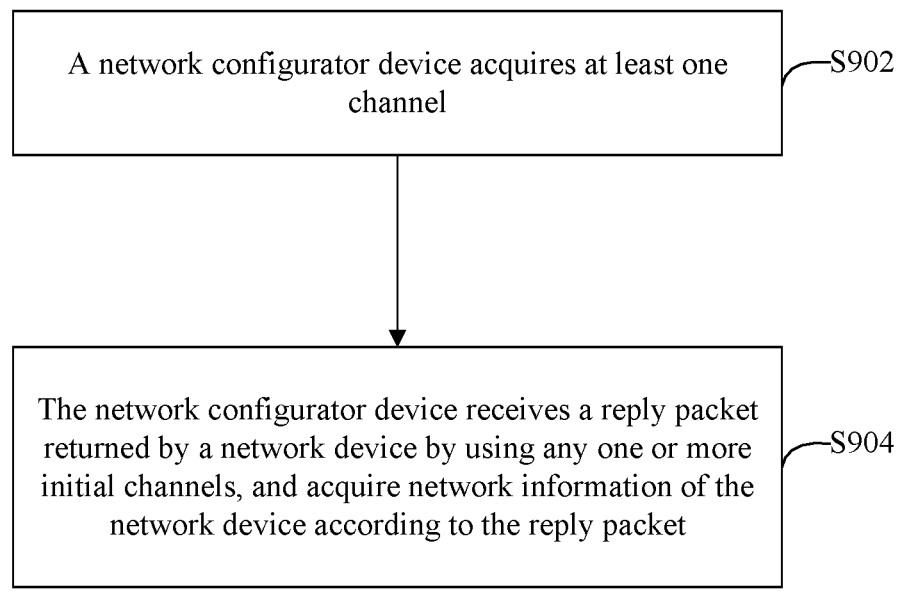
FIG. 9 is yet another flowchart of an exemplary method for monitoring a network connectivity status of a network device according to some embodiments of the present disclosure.

According to some embodiments of the present disclosure, methods for monitoring a network connectivity status of a network device are further provided. With the solutions provided herein, a configurator device can monitor a network device directly by using a preset initial channel or a target channel and determine network information of the network device based on a reply packet returned by the network device. FIG. 9 is a flowchart of an exemplary method 900 for monitoring a network connectivity status of a network device according to some embodiments of the present disclosure. As shown in FIG. 9, the exemplary method 900 can includes the following procedures.

In step S902, configurator device acquires at least one channel.

In step S904, the configurator device receives a reply packet returned by the network device by using any one or more initial channels and acquires network information of the network device according to the reply packet.

The network device feeds back the reply packet according to a request packet sent by the configurator device. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

In some embodiments, the first request packet can be used to request querying identification information of the hotspot to which the network device is successfully connected, or a network address. The reply packet returned by the network device by using an initial channel can include, for example, at least one of the following types of information: identification information of the hotspot to which the network device is successfully connected, and the associated network address information, routing information, domain name information, and network signal strength information.

The second request packet can be used to request querying network information of the hotspot to which the network device is successfully connected. The reply packet returned by the network device by using an initial channel can include, for example, a network connectivity status code representing a network connectivity status. The network connectivity status code can be a code that indicates a successful network connection, or a code that indicates a failed network connection. Further, the network connectivity status code can also be the reply information indicating a network connectivity or network access status. The reply information can include information indicating that the network device is successfully connected to the network, or information indicating that the network device fails to connect to the network.

In some embodiments, the network connectivity status can also be a part of the reply packet. When there is a network failure in the network device that has been successfully connected to the hotspot, the reply packet can further include a network failure reason code in addition to including the network connectivity status code. The reason code here can be, for example, one or more of Direct Link Setup teardown, no authorization, failed authorization, deauthentication and deauthorization, and can also be other network failure codes. For example, reference can be made to the description in the WiFi Alliance protocol specification for details regarding network failure reason codes. Additionally, the reply packet can include a network connectivity status code only, or a reason code only, and can also include both a status code and a reason code.

The third request packet can be used to request querying information of a list of all hotspots found by the network device. The reply packet returned by the network device by using an initial channel can include, for example, a hotspot list of all the hotspots found by the network device. The hotspot information included in the hotspot list can be any of the following or a combination of several of the following: a hotspot that has been successfully connected to the network device, at least one hotspot that can be connected to the network device but has not been connected to the network device currently, and other hotspots found by the network device. Further, the reply packet can also include, but not limited to, access permission information (e.g., an authorization type) of each hotspot included in the hotspot list, and the associated encryption type and network signal strength information.

In some embodiments, the at least one channel acquired can include at least one of the following: a target channel and at least one initial channel. The target channel can be the channel used when the network device is successfully connected to a hotspot. An initial channel can be a preset channel representing a default connection channel for connecting the network device to the network. In some embodiments, when the network device fails to connect to the hotspot, the request packet can be sent by using the initial channel. When the network device is successfully connected to the hotspot, the request packet can be sent by using the target channel.

Based on the foregoing embodiments, after acquiring a target channel and at least one initial channel, a configurator device can receive a reply packet that is returned by a network device. The reply packet can be returned by using any one or more of the preset initial channels, according to a request packet for requesting querying network connectivity status information sent by the configurator device. The configurator device can determine network information of the network device according to information included in the reply packet.

It is appreciated that the request packet sent by the configurator device can include, but is not limited to, a first request packet for requesting querying whether the network device is successfully connected to a hotspot, a second request packet for requesting querying network information of the network device that has been successfully connected to the hotspot, and a third request packet for requesting querying list information of all hotspots found by the network device. Different types of network connectivity status information can be queried by sending different types of request packets. For example, the status information can include a network configuration result of the network device, information of all found hotspots, and a network failure that exists after the hotspot is successfully connected and a reason of the failure.

Through the solutions provided by the foregoing embodiments, different request packets can be sent to the network device from the configurator device. Based on the reply packet returned by the network device, network information of the network device can be obtained in real time. A user can therefore know whether a network device is successfully connected to the network, and a network connectivity status of the network device that has been successfully connected to the network.

Figure 10:
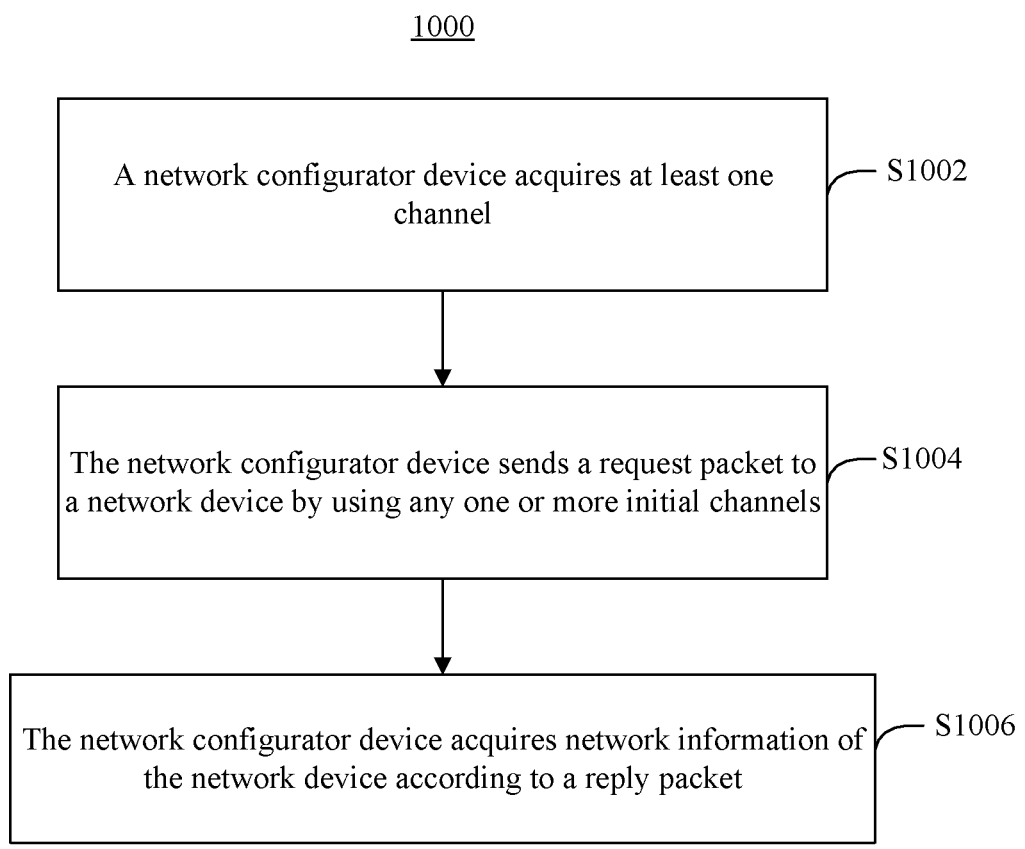
FIG. 10 is yet another flowchart of an exemplary method for monitoring a network connectivity status of a network device according to some embodiments of the present disclosure.

According to some embodiments of the present disclosure, methods for monitoring a network connectivity status of a network device are further provided. According to some solutions provided herein, a configurator device sends a request packet to a network device by using a preset initial channel. The configurator can use any one of the preset initial channels or the target channel to receive a reply packet returned by the network device. The configuration device can then determine network information of the network device according to the received reply packet. FIG. 10 is a flowchart of an exemplary method 1000 for monitoring a network connectivity status of a network device according to some embodiments of the present disclosure. As shown in FIG. 10, the exemplary method 1000 can include the following procedures.

In step S1002, a configurator device acquires at least one channel.

In step S1004, the configurator device sends a request packet to the network device by using any one or more initial channels. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

In step S1006, the configurator device acquires network information of the network device according to a reply packet when the reply packet is received from the network device. The network device can feed back a corresponding reply packet according to the request packet.

For example, the configurator device can use an initial channel to send the first request packet for requesting querying whether the network device is successfully connected to a hotspot. The reply packet returned by the network device can include at least one of the following types of information: identification information of the hotspot to which the network device is connected, and the associated network address information, routing information, domain name information, and network signal strength information.

The configurator device can also use the initial channel to send the second request packet for requesting querying whether network information of the network device that has been successfully connected to the hotspot. The reply packet returned by the network device can include: a network connectivity status code representing a network connectivity status. When there is a network failure in the network device that has been successfully connected to the hotspot, in addition to including a network connectivity status code, the reply packet can further include a reason code of the network failure.

Further, the configurator device can also use the initial channel to send the third request packet for requesting querying list information of all hotspots found by the network device. The reply packet returned by the network device can include: a hotspot list of all the hotspots found by the network device. The hotspot information included in the hotspot list can be any of the following or a combination of several of the following: a hotspot that has been successfully connected to the network device, at least one hotspot that can be connected to the network device but has not been connected to the network device currently, and other hotspots found by the network device. The reply packet can further include access permission information of each hotspot included in the hotspot list, and the corresponding encryption type and network signal strength information.

In some embodiments, the at least one channel acquired can include at least one of the following: a target channel and at least one initial channel. The target channel can be a channel used when the network device is successfully connected to a hotspot. The initial channel can include a preset channel representing a default connection channel for connecting the network device to the network. When the network device fails to connect to the hotspot, the reply packet can be received by using the initial channel. When the network device is successfully connected to the hotspot, the reply packet can be received by using the target channel.

Based on the foregoing embodiments of the present disclosure, the configurator device can acquire a target channel or at least one preset initial channel. The configurator device can send a request packet for querying different types of network information to the network device by using any one or more preset initial channels. The configurator device can receive a reply packet from the network device, which can be sent by using the target channel or any one or more preset initial channels. Based on the reply packet, the configurator device can determine network information of the network device according to information included in the reply packet. It is appreciated that the configurator device can send the request packet to the network device directly by using any one or more of the preset initial channels, without switching to the target channel.

It is appreciated that the request packet sent by the configurator device can include, but is not limited to, a first request packet for requesting querying whether the network device is successfully connected to a hotspot, a second request packet for requesting querying network connectivity status information of the network device that has been successfully connected to the hotspot, and a third request packet for requesting querying list information of all hotspots found by the network device. Different types of network connectivity status information can be queried by sending different types of request packets. For example, the status information can include a network configuration result of the network device, information of all found hotspots, and a network failure that exists after the hotspot is successfully connected and a reason of the failure.

Through the foregoing solutions, the configurator device can send different request packets to the network device. Based on a corresponding reply packet returned by the network device, network information of the network device can be obtained in real time. Accordingly, a user can know whether a network device is successfully connected to the network and determine a network connectivity status of the network device that has been connected to the network.

It should be appreciated that for ease of description, the foregoing method embodiments are described as a series of steps or procedures. Those skilled in the art should understand that embodiments of the present disclosure are not limited to the described here in. Some steps may be performed in another sequence, different from those described above, or at the same time. Further, some steps or procedures may not be performed in some embodiments.

Based on the foregoing descriptions, it is appreciated that the methods described above for monitoring a network connectivity status of a network device may be implemented by software plus a universal hardware platform and can also be implemented by hardware. Based on such understanding, the technical solutions of the present disclosure essentially, or a part of the solutions may be embodied in the form of a software product. The software product may be stored in a storage medium (such as a ROM/RAM, a magnetic disk, or an optical disc). For example, the storage medium may include a set of instructions that enable a terminal device to perform the methods provided in the present disclosure. The terminal device can be, for example, a mobile phone, a computer, a server, a network device, or the like.

Figure 11:
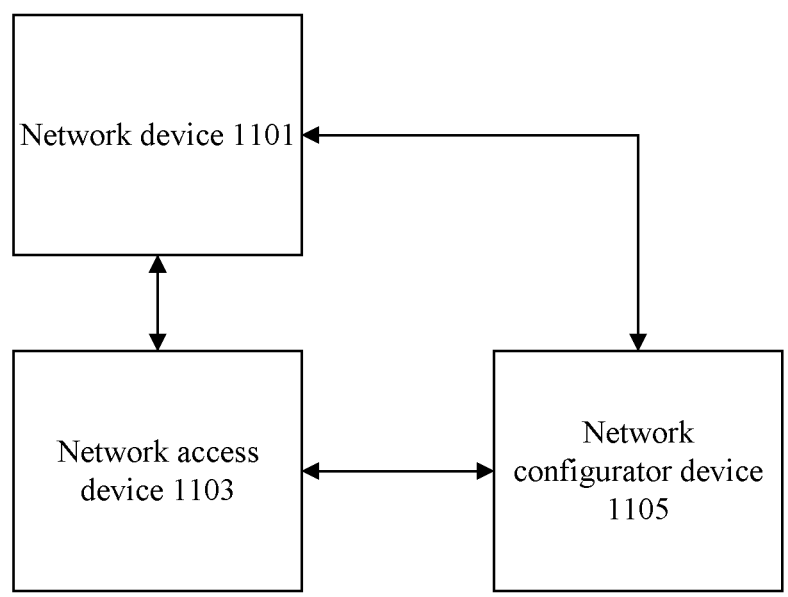
FIG. 11 is a schematic diagram of an exemplary system for monitoring a network connectivity status of a network device according to some embodiments of the present disclosure.

According to some embodiments of the present disclosure, systems for monitoring a network connectivity status of a network device are further provided. FIG. 11 is a schematic diagram of an exemplary system 1100 for monitoring a network connectivity status of a network device according to some embodiments of the present disclosure. For example, the exemplary system 1100 can be applied for implementing the method embodiments described above with reference to FIG. 9. As shown in FIG. 11, the exemplary system 1100 can include a network device 1101, a network access device 1103, and a network configurator device 1105.

Network device 1101, according to some embodiments, can be an IoT device based on WLAN technology. Network device 1101 can be connected to the network through network access device 1103.

Network configurator device 1105 can be located between network device 1101 and for example, a gateway device. Network configurator device 105 can be used to acquire at least one channel. After receiving a reply packet returned by network device 1101 by using any one or more initial channels, network configurator device 1105 can acquire network information of the network device according to the reply packet. Network device 1101 can feed back the reply packet according to the request packet sent by network configurator device 1105. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

In some embodiments, the at least one channel can include at least one of the following: a target channel and at least one initial channel. The target channel can be a channel used when a network device is successfully connected to a hotspot. An initial channel can be a preset channel representing a default connection channel for connecting the network device to the network.

Based on the above, in the process of connecting network device 1101 to the network via network access device 1103, one or more channels can be acquired by using network configurator device 1105. Network information of network device 1101 can be determined according to information included in a reply packet returned by network device 1101. The reply packet can be returned by using the initial channel and can be fed back according to a request packet for requesting querying certain network connectivity status information sent by network configurator device 1105.

Different types of network connectivity status information can be queried by sending different types of request packets. For example, the status information can include a network configuration result of network device 1101, information of all the hotspots found, and a network failure that exists after the hotspot is successfully connected and a reason of the failure.

With the foregoing solutions, a network configurator device can send different request packets to a network device. Based on a corresponding reply packet returned by the network device, network information of the network device can be obtained by the configurator device in real time. Accordingly, a user can know whether the network device is successfully connected to the network and determine a network connectivity status of the network device that has been connected to the network.

Figure 12:
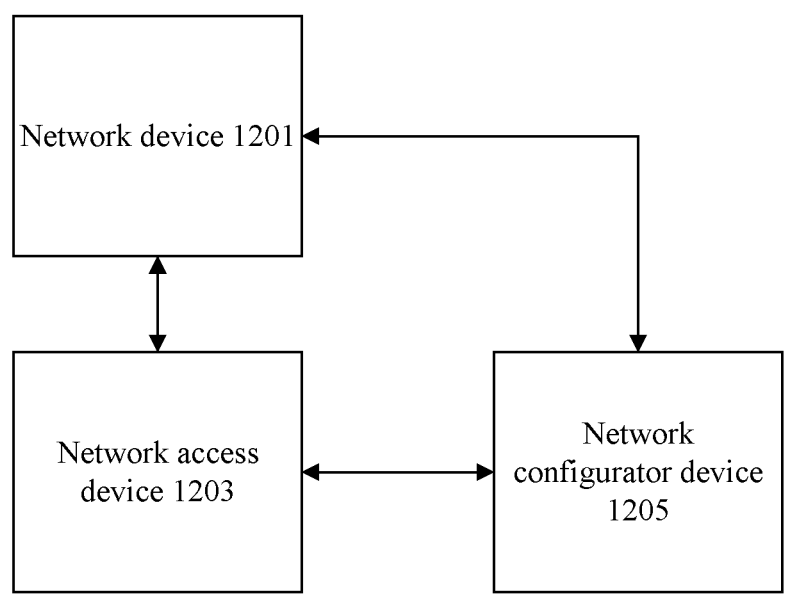
FIG. 12 is yet another schematic diagram of an exemplary system for monitoring a network connectivity status of a network device according to some embodiments of the present disclosure.

According to some embodiments of the present disclosure, systems for implementing the methods for monitoring a network connectivity status of a network device are further provided. FIG. 12 is a schematic diagram of an exemplary system 1200 for monitoring a network connectivity status of a network device according to some embodiments of the present disclosure. For example, the exemplary system 1200 can be applied for implementing the method embodiments described above with reference to FIG. 10. As shown in FIG. 12, the system includes: a network device 1201, a network access device 1203, and a network configurator device 1205.

[1] In some embodiments, network device 1201 can be an IoT device based on WLAN technology. Network device 1201 can be connected to the network through network access device 1203.

[2] Network configurator device 1205 is located between network device 1201 and for example, a gateway device. Network configurator device 1205 can be used to acquire at least one channel. Network configurator device 1205 can send a request packet to network device 1201 by using any one or more initial channels and acquire network information of network device 1201 according to a reply packet if the reply packet is received.

[3] Network device 1201 can feed back the reply packet according to the request packet sent by network configurator device 1205. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The hotspot information included in the hotspot list can be any of the following or a combination of several of the following: a hotspot that has been successfully connected to the network device, at least one hotspot that can be connected to the network device but has not been connected to the network device currently, and other hotspots found by the network device.

[4] Based on the above, in the process of connecting network device 1201 to the network by using network access device 1203, network configurator device 1205 can acquire a target channel and at least one initial channel. The target channel can be a channel used when network device 1201 is successfully connected to a hotspot. An initial channel can include a preset channel representing a default connection channel for connecting network device 1201 to the network. In some embodiments, network configurator device 1205 can send a request packet for querying a network connectivity status of network device 1201 by using any one or more preset initial channels. Network configurator device 1205 can determine network information of network device 1201 according to information included in a reply packet when the reply packet from network device 1201 is received.

Different types of network connectivity status information can be queried by sending different types of request packets. For example, the status information can include a network configuration result of network device 1201, information of all the hotspots found, and a network failure that exists after the hotspot is successfully connected and a reason of the failure.

With the foregoing solutions, a network configurator device can send different request packets to a network device. Based on a corresponding reply packet returned by the network device, network information of the network device can be obtained by the configurator device in real time. Accordingly, a user can know whether the network device is successfully connected to the network and determine a network connectivity status of the network device that has been connected to the network.

Figure 13:
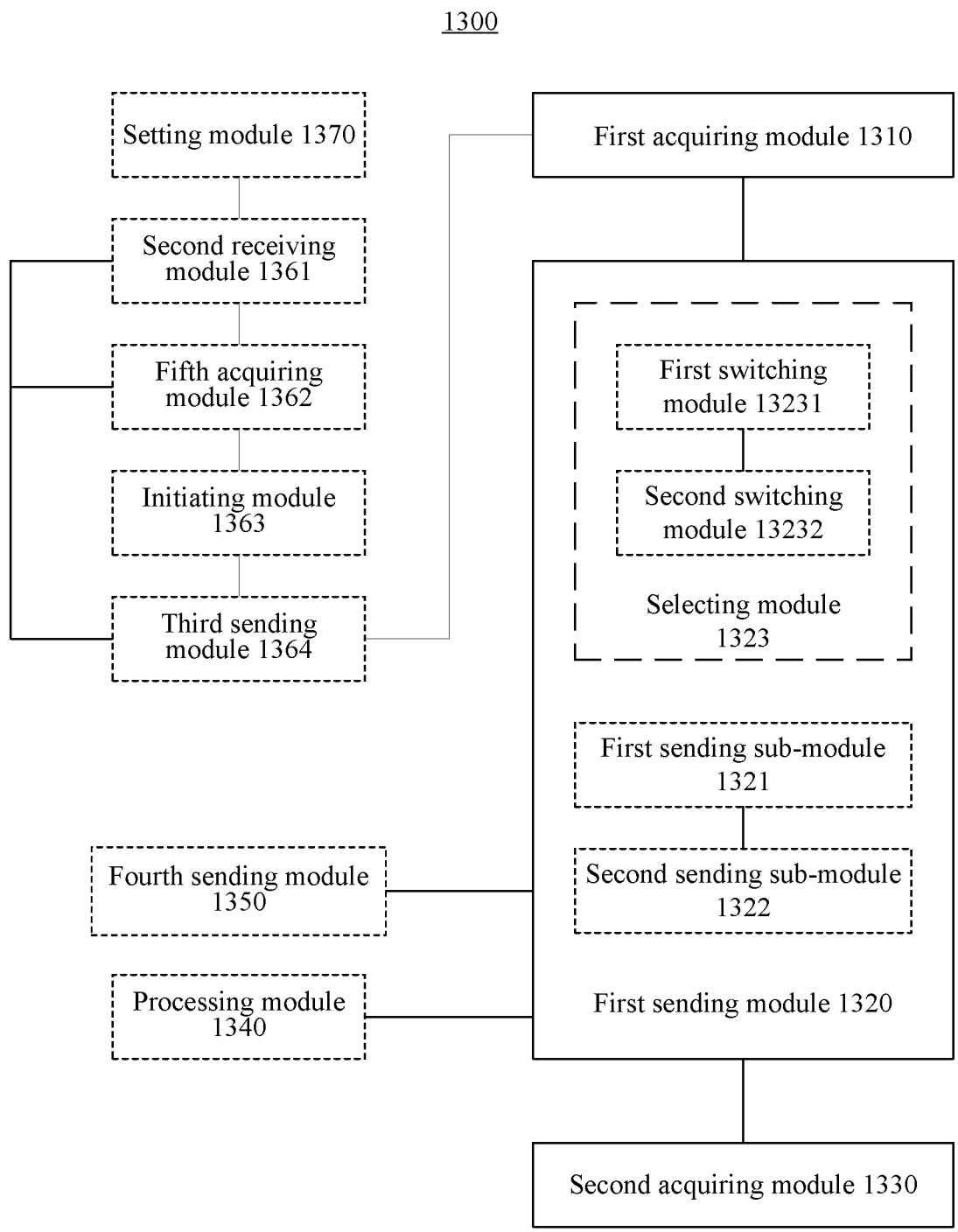
FIG. 13 is a schematic diagram of an exemplary apparatus for monitoring a network connectivity status of a network device according to some embodiments of the present disclosure.

According to some embodiments of the present disclosure, apparatuses for implementing methods for monitoring a network connectivity status of a network device are further provided. FIG. 13 is a schematic diagram of an exemplary apparatus 1300 for monitoring a network connectivity status of a network device according to some embodiments of the present disclosure. For example, the exemplary apparatus 1300 can be used to implement the method embodiments described above with reference to FIG. 2-FIG. 8. As shown in FIG. 13, the exemplary apparatus 1300 can include: a first acquiring module 1310, a first sending module 1320, and a second acquiring module 1330.

First acquiring module 1310 can be used to acquire at least one channel.

First sending module 1320 can be configured to send a request packet to a network device by using the at least one channel. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

Second acquiring module 1330 can be used to acquire network information of the network device according to a reply packet when the reply packet is received. The network device can feed back the corresponding reply packet according to the request packet.

It should be appreciated that first acquiring module 1310, the first sending module 1320, and the second acquiring module 1330 can perform procedures similar to those described above with respect to steps S202 to S206 of FIG. 2. Processing performed by the above modules can be similar to, but not limited to, those implemented by the corresponding steps. Further, it is appreciated that the above modules, as a part of the apparatus, can also be executed in a computer system through a set of computer executable instructions.

In some embodiments, the at least one channel can include at least one of the following: a target channel and at least one initial channel. The target channel can be the channel used when the network device is successfully connected to a hotspot. An initial channel can include a preset channel representing a default connection channel for connecting the network device to the network.

Based on the above, in the process of configuring network setting of a network device to be connected to a network by using a network configurator device, first acquiring module 1310 can acquire one or more channels through which the network device can connect to the network via the network access device. First sending module 1320 can send a request packet for requesting network information of the network device to the network device by using at least one channel. First sending module 1320 can then detect whether a reply packet returned by the network device according to the request packet is received. Second acquiring module 1330 can determine network information of the network device according to information included in the reply packet when the reply packet is received.

Different types of network connectivity status information can be queried by sending different types of request packets. For example, the status information can include a network configuration result of the network device, information of all the hotspots found by the network device, and a network failure that exists after the hotspot is successfully connected and a reason of the failure.

With the foregoing solutions, a network configurator device can send different request packets to a network device. Based on a corresponding reply packet returned by the network device, network information of the network device can be obtained by the configurator device in real time. Accordingly, a user can know whether the network device is successfully connected to the network and determine a network connectivity status of the network device that has been connected to the network.

In some embodiments, first sending module 1320 can further include a first sending sub-module 1321. First sending sub-module 1321 can be used to send the request packet on each of the at least one channel sequentially by using the configurator device and determine whether a reply packet is received. If the reply packet is received, the configurator device can stop sending the request packet on the next channel. If the reply packet is not received, the configurator device continues sending the request packet on the next channel of the at least one channel and determines whether the reply packet is received.

It is appreciated that first sending sub-module 1321 can perform procedures similar to those described above with reference to FIG. 4. That is, first sending sub-module 1321 can perform the corresponding processing described above in FIG. 4, but not limited to the disclosure therein. Further, it is appreciated that first sending sub-module 1321, as a part of the apparatus, can also be executed in a computer system through a set of computer executable instructions.

In some embodiments, the exemplary apparatus 1300 can further include: a selecting module 1323. Selecting module 1323 can be configured to select a target channel or an initial channel by traversing the at least one channel. In some embodiments, selecting module 1323 can include a first switching module 13231 and a second switching module 13232. First switching module 13231 can be used for the configurator device to switch to the target channel to send the request packet when the selected channel is the target channel. Second switching module 13232 can be used for the configurator device to switch to the initial channel to send the request packet when the selected channel is the initial channel.

It is appreciated that selecting module 1323, first switching module 13231 and second switching module 13232 can perform procedures similar to those described above with reference to FIG. 5. That is, selecting module 1323, first switching module 13231 and second switching module 13232 can perform the corresponding processing described above in FIG. 5, but not limited to the disclosure therein. Further, it is appreciated that selecting module 1323, first switching module 13231, and second switching module 13232, as a part of the apparatus, can also be implemented in a computer system through a set of computer executable instructions.

In some embodiments, the exemplary apparatus 1300 can further include a second sending sub-module 1322. Second sending sub-module 1322 can be used for the configurator device to switch between the target channel and the initial channel to send the request packet, and to determine whether a reply packet is received. The configurator device can receive a reply packet returned by the network device which may directly switch to the initial channel.

It should be appreciated that second sending sub-module 1322 can perform procedures similar to those described above with reference to FIG. 6. That is, second sending sub-module 1322 can perform the corresponding processing described above in FIG. 6, but not limited to the disclosure therein. It should be appreciated that second sending sub-module 1322, as a part of the apparatus, can also be implemented in a computer system through a set of computer executable instructions.

In some embodiments, the exemplary apparatus 1300 can further include a processing module 1340. Processing module 1340 can be configured to, when the configurator device fails to receive the reply packet, return to select another channel and continue to use the selected channel to monitor the request packet sent to the network device.

It should be appreciated that processing module 1340 can perform procedures similar to those described above in step S208 with reference to FIG. 2. That is, processing module 1340 can perform the corresponding processing described above in FIG. 2, but not limited to the disclosure therein. It should be appreciated that processing module 1340, as a part of the apparatus, can also be implemented in a computer system through a set of computer executable instructions.

In some embodiments, the request packet can include a query request frame for requesting acquisition of network information of the network device. The reply packet can include a query response frame that includes the network information of the network device.

In some embodiments, the exemplary apparatus 1300 can further include a second receiving module 1361, a fifth acquiring module 1362, an initiating module 1363, and a third sending module 1364. Second receiving module 1361 can be configured to receive a network configuration frame sent by the configurator device. Fifth acquiring module 1362 can be configured to acquire hotspot information from the network configuration frame if the network configuration frame is received. Initiating module 1363 can be configured to initiate a hotspot connection according to the hotspot information. Third sending module 1364 can be configured to switch to the target channel when the hotspot connection is successful and send a reply packet to the configurator device by using the target channel.

It should be appreciated that second receiving module 1361, fifth acquiring module 1362, initiating module 1363, and third sending module 1364 can perform procedures similar to those described above with reference to FIG. 7. That is, second receiving module 1361, fifth acquiring module 1362, initiating module 1363, and third sending module 1364 can perform the corresponding processing described above in FIG. 7, but not limited to the disclosure therein. It should be appreciated that the above modules, as a part of the apparatus, can also be implemented in a computer system through a set of computer executable instructions.

In some embodiments, the apparatus further includes a setting module 1370. Setting module 1370 can be configured to preset at least one initial channel.

It should be appreciated that setting module 1370 can be configured to perform procedures similar to those described above in step S701 with reference to FIG. 7. That is, setting module 1370 can perform the corresponding processing described above in step S701, but not limited to the disclosure therein. It should be appreciated that setting module 1370, as a part of the apparatus, can also be implemented in a computer system through a set of computer executable instructions.

In some embodiments, the exemplary apparatus 1300 can further include a fourth sending module 1350. Fourth sending module 1350 can be configured for the network device to send the reply packet to the configurator device by using an initial channel. This may occur when the network device fails to receive the network configuration frame, or if the network device fails to connect to the hotspot.

It should be appreciated that fourth sending module 1350 can perform procedures similar to those described above in step S710 with reference to FIG. 7. That is, fourth sending module 1350 can perform the corresponding processing described above in step S710, but not limited to the disclosure therein. It should be appreciated that setting module 1350, as a part of the apparatus, can also be implemented in a computer system through a set of computer executable instructions.

Figure 14:
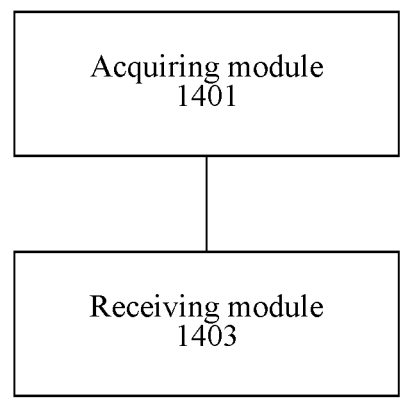
FIG. 14 is yet another schematic diagram of an exemplary apparatus for monitoring a network connectivity status of a network device according to some embodiments of the present disclosure.

According to some embodiments of the present disclosure, apparatuses for implementing methods for monitoring a network connectivity status of a network device are further provided. FIG. 14 is a schematic diagram of an exemplary apparatus 1400 for monitoring a network connectivity status of a network device according to some embodiments of the present disclosure. For example, the exemplary apparatus 1400 can be used to implement methods described above with reference to FIG. 9. As shown in FIG. 14, the exemplary apparatus 1400 can include an acquiring module 1401 and a receiving module 1403.

Acquiring module 1401 can be configured to acquire at least one channel. Receiving module 1403 can be configured to receive a reply packet returned by the network device by using any one or more initial channels, and to acquire network information of the network device according to the reply packet.

The network device can feed back the reply packet according to a request packet sent by the configurator device. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

It should be appreciated that acquiring module 1401 and receiving module 1403 can perform procedures similar to those described above with reference to FIG. 9. That is, acquiring module 1401 and receiving module 1403 can perform the corresponding processing described above with reference to FIG. 9, but not limited to the disclosure therein. It should be appreciated that acquiring module 1401 and receiving module 1403, as a part of the apparatus, can also be implemented in a computer system through a set of computer executable instructions.

In some embodiments, the at least one channel can include at least one of the following: a target channel and at least one initial channel. The target channel can be a channel used when the network device is successfully connected to a hotspot. An initial channel can include a preset channel representing a default connection channel for connecting the network device to the network.

Based on the above, acquiring module 1401 can acquire a target channel and at least one initial channel. Receiving module 1403 can receive a reply packet that is returned by the network device by using any one or more preset initial channels. The reply packet can be fed back according to a request packet for requesting querying different types of network connectivity status information sent by the configurator device. The configurator device can determine network information of the network device according to information included in the reply packet.

It is appreciated that the request packet sent by the configurator device can include, but is not limited to, a first request packet for requesting querying whether the network device is successfully connected to a hotspot, a second request packet for requesting querying network connectivity status information of the network device that has been successfully connected to the hotspot, and a third request packet for requesting querying list information of all hotspots found by the network device. Different types of network connectivity status information can be queried by sending different types of request packets. For example, the status information can include a network configuration result of the network device, information of all the hotspots found, and a network failure that exists after the hotspot is successfully connected and a reason for the failure.

With the foregoing solutions, a network configurator device can send different request packets to a network device. Based on a corresponding reply packet returned by the network device, network information of the network device can be obtained by the configurator device in real time. Accordingly, a user can know whether the network device is successfully connected to the network and determine a network connectivity status of the network device that has been connected to the network.

Figure 15:
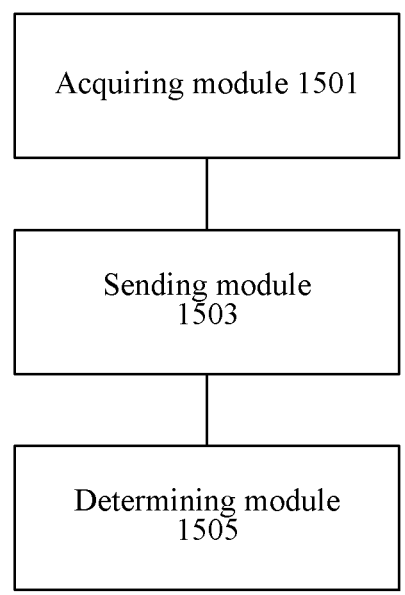
FIG. 15 is yet another schematic diagram of an exemplary apparatus for monitoring a network connectivity status of a network device according to some embodiments of the present disclosure.

According to some embodiments of the present disclosure, apparatuses for implementing methods for monitoring a network connectivity status of a network device are further provided. FIG. 15 is a schematic diagram of an exemplary apparatus 1500 for monitoring a network connectivity status of a network device according to some embodiments of the present disclosure. For example, the exemplary apparatus 1500 can be used to implement the methods described above with reference to FIG. 10. As shown in FIG. 15, the exemplary apparatus 1500 can include an acquiring module 1501, a sending module 1503, and a determining module 1505.

Acquiring module 1501 can be configured to acquire at least one channel.

Sending module 1503 can be configured to send a request packet to the network device by using any one or more initial channels.

Determining module 1505 can be configured to acquire network information of the network device according to a reply packet when the reply packet is received.

The network device can feed back the reply packet according to a request packet sent by the configurator device. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

It is appreciated that that acquiring module 1501, sending module 1503, and determining module 1505 can perform procedures similar to those described above with reference to FIG. 10. That is, acquiring module 1501, sending module 1503, and determining module 1505 can perform the corresponding processing described above with reference to FIG. 10, but not limited to the disclosure therein. It should be appreciated that acquiring module 1501, sending module 1503, and determining module 1505, as a part of the apparatus, can also be implemented in a computer system through a set of computer executable instructions.

In some embodiments, the at least one channel can include at least one of the following: a target channel and at least one initial channel. The target channel can be a channel used when the network device is successfully connected to a hotspot. An initial channel can include a preset channel representing a default connection channel for connecting the network to the network. The configurator device can send the request packet to the network device directly by using any one or more preset initial channels, without switching to the target channel.

Based on the above, acquiring module 1501 can acquire a target channel and at least one initial channel. Sending module 1503 can send a request packet for requesting querying different types of network connectivity status information to the network device by using any one or more preset initial channels. Determining module 1505 can determine network information of the network device according to information included in a reply packet when the reply packet from the network device is received.

It is appreciated that the request packet sent by the configurator device can include, but is not limited to, a first request packet for requesting querying whether the network device is successfully connected to a hotspot, a second request packet for requesting querying network connectivity status information of the network device that has been successfully connected to the hotspot, and a third request packet for requesting querying list information of all hotspots found by the network device. Different types of network connectivity status information can be queried by sending different types of request packets. The status information can include, for example, a network configuration result of the network device, information of all the hotspots found, and a network failure that still exists after the hotspot is successfully connected and a reason of the failure.

With the foregoing solutions, a network configurator device can send different request packets to a network device. Based on a corresponding reply packet returned by the network device, network information of the network device can be obtained by the configurator device in real time. Accordingly, a user can know whether the network device is successfully connected to the network and determine a network connectivity status of the network device that has been connected to the network.

Figure 16:
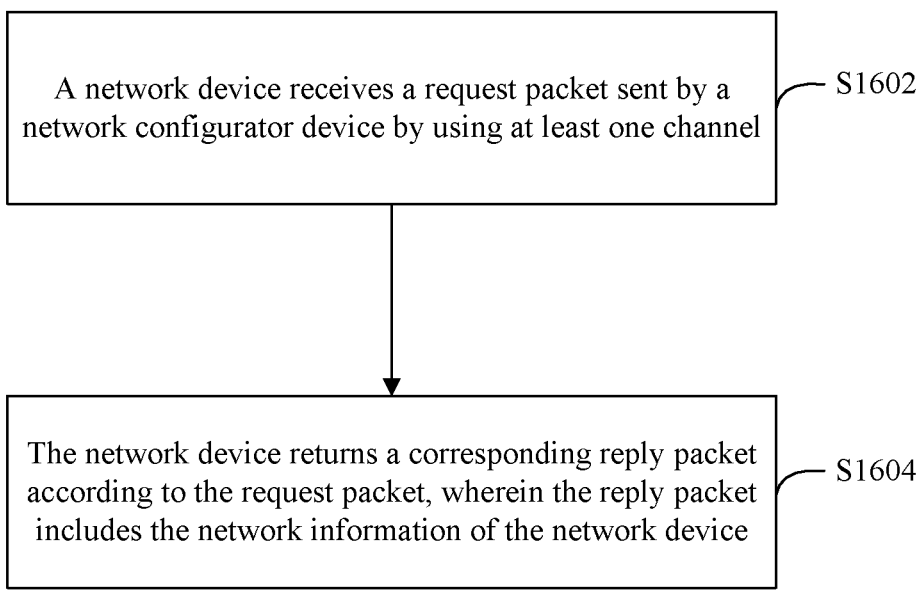
FIG. 16 a flowchart of an exemplary method for monitoring a network connectivity status of a network device according to some embodiments of the present disclosure.

According to some embodiments of the present disclosure, methods for monitoring a network connectivity status of a network device are further provided. For example, some methods described herein can be applied in the system described above with reference to FIG. 1. It is appreciated that the procedures or steps described herein can also be performed in a computer system through the execution of a set of computer executable instructions. Further, they can also be implemented in an order different from the order described here. FIG. 16 is a flowchart of an exemplary method 1600 for monitoring a network connectivity status of a network device according to some embodiments of the present disclosure. As shown in FIG. 16, the exemplary method 1600 can include the following procedures.

In step S1602, the network device receives a request packet sent by a network configurator device by using at least one channel. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

In some embodiments, the at least one channel can include at least one of the following: a target channel and at least one initial channel. The target channel can be a channel used when the network device is successfully connected to a hotspot. An initial channel can include a preset channel representing a default connection for connecting the network device to the network. The configurator device can send a request packet to the network device by using any one of the initial channel or the target channel. The network device receives the request packet sent by the configurator device and can return corresponding information according to the request content included in the request packet.

In step S1604, the network device returns a corresponding reply packet according to the request packet, wherein the reply packet includes network information of the network device. For example, the network device receives the request packet from the configurator device and can return a corresponding reply packet according to the type of the request packet.

When the request packet is the first request packet for querying whether the network device is successfully connected to a hotspot, the returned network information can include, but is not limited to, identification information of a hotspot to which the network device is successfully connected, and the associated network address information, routing information, domain e information, and network signal strength information.

When the request packet is the second request packet for querying whether there is a network failure in the network device that has been successfully connected to the hotspot, the returned network information can include, but is not limited to, a network connectivity status code and a reason code.

When the request packet is the third request packet for querying a hotspot list of all hotspots found by the network device, the returned network information can include, but is not limited to, a hotspot list of all the hotspots found by the network device. The hotspot information included in the hotspot list can be any of the following or a combination of several of the following: a hotspot that has been successfully connected to the network device, at least one hotspot that can be connected to the network device but has not been connected to the network device currently, and other hotspots found by the network device. Further, the returned network information can further include access permission information of each hotspot included in the hotspot list, and the corresponding encryption type and network signal strength information.

Based on the above, the network device can receive a request packet for requesting network information of the network device. The request packet can be sent by the configurator device by using a target channel or any initial channel. The network device can return a corresponding reply packet including network information of the network device to the configurator device according to the received request packet. Different types of network connectivity status information can be queried by sending different types of request packets. For example, the status information can include a network configuration result of the network device, information of all the hotspots found, and a network failure that still exists after the hotspot is successfully connected and a reason of the failure.

With the foregoing solutions, a network configurator device can send different request packets to a network device. Based on a corresponding reply packet returned by the network device, network information of the network device can be obtained by the configurator device in real time. Accordingly, a user can know whether the network device is successfully connected to the network and determine a network connectivity status of the network device that has been connected to the network.

When the request packet is the first request packet, the reply packet returned by the network device according to the request packet can include at least one of the following types of information: identification information of the hotspot to which the network device is successfully connected, and the associated network address information, routing information, domain name information, and network signal strength information. When the request packet is the second request packet, the reply packet returned by the network device according to the request packet can include at least one of the following types of information: a network connectivity status code and a reason code. When the request packet is the third request packet, the reply packet returned by the network device according to the request packet can include at least one of the following types of information: a hotspot list of all hotspots found by the network device, access permission information of each hotspot included in the hotspot list, and the corresponding encryption type and network signal strength information.

Further, embodiments of the present disclosure can be implemented with a computer terminal. The computer terminal can be any computer terminal in a computer terminal group. In some embodiments, the computer terminal can also be a terminal device such as a mobile terminal. The computer terminal can be located in at least one access device in a computer network with in a plurality of network devices.

Figure 17:
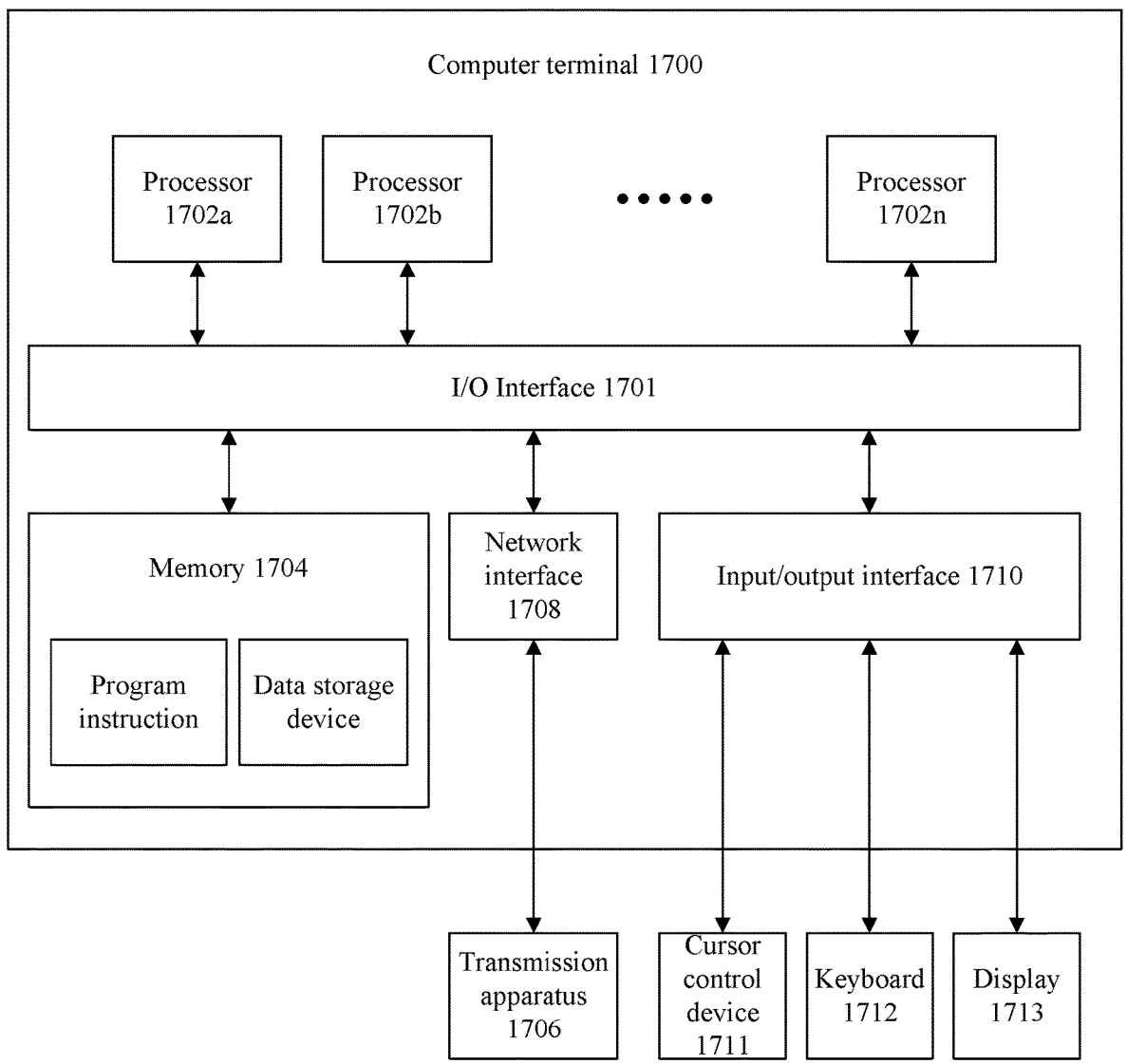
FIG. 17 is a structural diagram of an exemplary computer terminal according to some embodiments of the present disclosure.

FIG. 17 is a structural diagram of an exemplary computer terminal 1700 according to some embodiments of the present disclosure. As shown in FIG. 17, computer terminal 1700 can include I/O interface 1701, one or more processors 1702, a memory 1704, a transmission module 1706, a network interface 1708, and an input/output interface 1710. The exemplary apparatus 1700 may further include a cursor control device 1711, a keyboard 1712, and a display 1713.

Processor 1702 can include, but is not limited to, a microprocessor MCU, a programmable logic device FPGA, or another processing apparatus. Memory 1704 can be used to store data. Transmission module 176 can be used for a communication function. Those of ordinary skill in the art can understand that the structure shown in FIG. 17 is merely an example, which does not limit the actual structure of the foregoing electronic apparatus. In some embodiments, computer terminal 1700 can further include more or fewer components than those shown in FIG. 17, or has a configuration different from that shown in FIG. 17. For example, the computer terminal can further include components such as a Universal Serial Bus (USB) port (which can also be included as a port of the I/O interface), a network interface, a power source, or a camera.

It is appreciated that the one or more processors 1702 or other data processing circuits can be referred to as a data processing circuit. The data processing circuit can be wholly or partially embodied hardware, firmware, or any other combination thereof and can involve software. In addition, the data processing circuit can be a single separate processing module. It can also be wholly or partially integrated into another element in the computer terminal 1700.

Memory 1704 can be used to store software programs and modules of application software. For example, memory 1704 can store program instructions corresponding to methods for monitoring a network connectivity status of a network device as provided in the present disclosure. Processor 1702 can execute the software program and modules stored in the memory 1704 to implement various functional applications and data processing. For example, processor 1702 can execute the instructions for performing methods for monitoring a network connectivity status of a network device as described above. Memory 1704 can include a high-speed random access memory. It can further include a non-volatile memory such as one or more magnetic storage apparatuses, a flash memory, or other non-volatile solid-state memories. In some embodiments, memory 1704 can further include memories remotely disposed with respect to processor 1702. The remote memories can be connected to computer terminal 1700 through a network. Examples of the network include, but are not limited to, the Internet, an intranet, a local area network, a mobile communications network, and a combination of the above.

Transmission apparatus 1706 can be configured to receive or send data through a network. For example, the network can include a wireless network provided by a communications provider of computer terminal 1700. In some embodiments, transmission apparatus 1706 can include one or more Network Interface Controllers (NICs), which can be connected to other network devices through a base station, to communicate via the Internet. Further, transmission apparatus 1706 can also be a Radio Frequency (RF) module, which can enable communication with the Internet in a wireless manner. It is appreciated that each of the NICs can include the sending modules and the acquiring modules described above.

Display 1713 can be, for example, a touch-screen Liquid Crystal Display (LCD). The LCD can enable a user to interact with a user interface of computer terminal 1700.

It is appreciated that in some embodiments, computer terminal 1700 shown in FIG. 17 can include hardware elements (such as circuits), software elements (such as computer codes stored in a computer readable medium), or a combination of hardware elements and software elements. It should be appreciated that FIG. 17 is only an example. Components included in the terminal may vary and is not limited by the description herein.

It should be appreciated that in some embodiments, computer terminal 1700 shown in FIG. 17 can include a touch display, also referred to as touch screen or touch display screen. In some embodiments, computer terminal 1700 can include a Graphical User Interface (GUI). The user can perform man-machine interaction with the GUI through finger touch or gestures on a touch-sensitive surface. The man-machine interaction functions can include, but not limited to, the following interactions: creating webpages, drawing, word processing, creating electronic documents, games, videoconferencing, instant messaging, sending and receiving e-mails, call interfaces, playing digital video, playing digital music or web browsing, etc. Computer executable instructions for implementing the man-machine interaction functions can be configured/stored in one or more computer program products or computer readable storage mediums.

In some embodiments, computer terminal 1700 can execute program codes to perform the following procedures of a method for monitoring a network connectivity status of a network device. A configurator device acquires at least one channel. The configurator device sends a request packet to the network device by using the at least one channel. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The configurator device can acquire network information of the network device according to a reply packet when the reply packet is received. The network device can feed back the corresponding reply packet according to the request packet.

In some embodiments, processor 1702 can further execute program codes to perform the following procedures. The configurator device sends the request packet on each channel of the at least one channel sequentially and determines whether the reply packet is received. Each time after the request packet is sent on one of the channels, the configurator device monitors whether the reply packet is received on that channel. If a reply packet is received, the configurator device can stop sending the request packet on the next channel. If the reply packet is not received, the configurator device continues to send the request packet on the next channel of the at least one channel and determines whether the reply packet is received.

In some embodiments, processor 1702 can further execute program codes to perform the following procedures: the configurator device selecting a target channel or an initial channel, by traversing the at least one channel.

In some embodiments, processor 1702 can further execute program codes to perform the following procedures. When channel parameters of the target channel are acquired, the selected channel can be the target channel. The configurator device can switch to the target channel to send the request packet.

In some embodiments, processor 1702 can further execute program codes to perform the following procedures. The configurator device scans the at least one channel and select the target channel and at least one initial channel. The configurator device can acquire channel parameters of each channel.

In some embodiments, processor 1702 can further execute program codes to perform the following procedures. When the channel parameters of each channel are acquired, the selected channel can be any of the channels. The configurator device can switch between the channels to send the request packet.

In some embodiments, processor 1702 can further execute program codes to perform the following procedures. When the configurator device fails to receive a reply packet, the configurator device can return to select another channel. The configurator device can continue to use the selected channel to monitor the request packet sent by the network device.

In some embodiments, the request packet can include at least: a query request frame for requesting acquisition of network information of the network device. The reply packet can include at least: a query response frame that includes the network information of the network device.

In some embodiments, processor 1702 can further execute program codes to perform the following procedures. The network device receives a network configuration frame sent by the configurator device. The network device acquires hotspot information from the network configuration frame if the network configuration frame is successfully received. The network device initiates a hotspot connection according to the hotspot information. When the hotspot connection is successful, the network device can switch to a target channel and send a reply packet to the configurator device by using the target channel.

In some embodiments, processor 1702 can further execute program codes to perform the following procedures: the network device presetting at least one initial channel.

In some embodiments, processor 1702 can further execute program codes to perform the following procedures. When the network device fails to receive the network configuration frame or the network device fails to be connected to the hotspot, the network device sends a reply packet to the configurator device by using an initial channel.

In some embodiments, processor 1702 can further execute program codes to perform the following procedures. The configurator device acquires at least one channel. The configurator device receives a reply packet returned by a network device by using any one or more initial channels. The configurator device acquires network information of the network device according to the reply packet. The network device can feed back the reply packet according to a request packet sent by the configurator device. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

In some embodiments, processor 1702 can further execute program codes to perform the following procedures. The configurator device acquires at least one channel. The configurator device sends a request packet to a network device by using any one or more initial channels. The configurator device acquires network information of the network device according to a reply packet when the reply packet is received. The network device can feed back the reply packet according to a request packet sent by the configurator device. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

It is appreciated that the structure shown in FIG. 17 is merely an example. In some embodiments, computer terminal 1700 can also be a smart phone (such as an Android phone or iOS phone), a tablet computer, a handheld computer, a Mobile Internet Device (MID), a PAD, or another terminal device. FIG. 17 does not limit the actual structure of the electronic apparatus. For example, computer terminal 1700 can further include more or fewer components (such as a network interface and a display apparatus) than those shown in FIG. 17, or has a configuration different from that shown in FIG. 17. It is further appreciated that all or some of the procedures in the methods of the foregoing embodiments can also be implemented by a program instructing relevant hardware components of a terminal device. The program can be stored in a computer readable storage medium. The storage medium can include: a flash memory, a Read-Only Memory (ROM), a Random Access Memory (RAM), a magnetic disk, an optical disk, and so on.

According to some embodiments of the present disclosure, storage media are provided. In some embodiments, the storage media can be used to store program codes corresponding to methods for monitoring a network connectivity status of a network device provided in the present disclosure. When the program is executed, an associated device where the storage medium is located can be controlled to perform methods for monitoring a network connectivity status of a network device as described above. In some embodiments, the storage medium can be located in any computer terminal of a computer terminal group in a computer network.

In some embodiments, the storage medium can be used to store program codes for performing the following procedures. A configurator device acquires at least one channel. The configurator device sends a request packet to a network device by using the at least one channel. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The configurator device can acquire network information of the network device according to a reply packet when the reply packet is received. The network device can feed back the corresponding reply packet according to the request packet.

In some embodiments, the storage medium can be used to store program codes for performing the following procedures. The configurator device sends the request packet on each channel of the at least one channel sequentially and determines whether the reply packet is received. Each time the request packet is sent on one channel, the configurator device monitors whether the reply packet is received on that channel. If the reply packet is received, the configurator device stops sending the request packet on the next channel. If the reply packet is not received, the configurator device continues sending the request packet on the next channel of the at least one channel and determines whether the reply packet is received.

In some embodiments, the storage medium can be used to store program codes for performing the following procedures: the configurator device selecting a target channel or an initial channel by traversing the at least one channel.

In some embodiments, the storage medium can be used to store program codes for performing the following procedures. When channel parameters of the target channel are acquired, the selected channel can be the target channel. The configurator device can switch to the target channel to send the request packet.

In some embodiments, the storage medium can be used to store program codes for performing the following procedures. The configurator device scans the at least one channel and selects a target channel and at least one initial channel. The configurator can acquire channel parameters of each channel.

In some embodiments, the storage medium can be used to store program codes for performing the following procedures. When the channel parameters of each channel are acquired, the selected channel can be any of the channels. The configurator device can switch between the channels to send the request packet.

In some embodiments, the storage medium can be used to store program codes for performing the following procedures. When failing to receive a reply packet, the configurator device returns to select another channel, and continues to use the selected channel to monitor the request packet sent to the network device.

In some embodiments, the request packet can include, for example, a query request frame for requesting acquisition of network information of the network device. The reply packet can include, for example, a query response frame that includes the network information of the network device.

In some embodiments, the storage medium can be used to store program codes for performing the following procedures. The network device receives a network configuration frame sent by the configurator device. The network device acquires hotspot information from the network configuration frame if the network configuration frame is successfully received. The network device can initiate a hotspot connection according to the hotspot information. When the hotspot connection is successful, the network device can switch to a target channel and send a reply packet to the configurator device by using the target channel.

In some embodiments, the storage medium can be used to store program codes for performing the following procedures. Before the network device receives a network configuration frame sent by the configurator device, the network device presets at least one initial channel.

In some embodiments, the storage medium can be used to store program codes for performing the following procedures. When the network device fails to receive the network configuration frame or the network device fails to be connected to the hotspot, the network device sends a reply packet to the configurator device by using an initial channel.

In some embodiments, the storage medium can be used to store program codes for performing the following procedures. A configurator device acquires at least one channel. The configurator device receives a reply packet returned by the network device by using any one or more initial channels. The configurator device can acquire network information of the network device according to the reply packet. The network device can feed back the reply packet according to a request packet sent by the configurator device. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device.

In some embodiments, the storage medium can be used to store program codes for performing the following procedures. A configurator device acquires at least one channel. The configurator device sends a request packet to the network device by using any one or more initial channels. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The configurator device can acquire network information of the network device according to a reply packet when the reply packet is received, wherein the network device feeds back the corresponding reply packet according to the request packet.

According to some embodiments, systems for monitoring the network status of a network device are provided. One exemplary system includes a processor, and a memory connected to the processor. The memory can provide the processor with instructions for performing the following procedures.

A configurator device acquiring at least one channel. The configurator device sends a request packet to a network device by using the at least one channel. The request packet can include at least one of the following: a first request packet for querying whether the network device is successfully connected to a hotspot, a second request packet for querying whether there is a network failure in the network device that has been successfully connected to the hotspot, and a third request packet for querying a hotspot list of all hotspots found by the network device. The configurator device can acquire network information of the network device according to a reply packet when the reply packet is received. The network device can feed back the corresponding reply packet according to the request packet.

Based on the above, a configurator device can acquire a target channel or at least one initial channel through which the network device is connected to the network via a network access device. The configurator device can send a request packet for requesting network information of the network device to the network device by using the acquired channel. The configurator device can detect whether a reply packet returned by the network device according to the request packet is received. The network information of the network device can be acquired according to the reply packet when the reply packet is received. It is appreciated that the at least one channel can include one or more initial channels as well as a target channel. The target channel can be a channel used when the network device is successfully connected to a hotspot. An initial channel can include a preset channel representing a default connection channel for connecting the network device to the network. The configurator device can use any channel in the initial channel or the target channel to monitor the request packet sent to the network device, and determine whether the reply packet returned by the network device according to the request packet is received.

With the foregoing solutions, a network configurator device can send different request packets to a network device. Based on a corresponding reply packet returned by the network device, network information of the network device can be obtained by the configurator device in real time. Accordingly, a user can know whether the network device is successfully connected to the network and determine a network connectivity status of the network device that has been connected to the network. In the foregoing embodiments of the present disclosure, the description of each embodiment may focus on a different aspect. For aspects that are not described in certain embodiments, reference can be made to the relevant description of other embodiments.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

Further, the units described as separate parts may or may not be physically separate. Parts displayed as units may or may not be physical units. They may be located in a same location or may be distributed on a plurality of network units. Some or all of the units may be selected according to actual needs to achieve the objectives of the solutions of the embodiments. In addition, functional units in the embodiments of the present disclosure may be integrated into one processing unit. Each of the units may exist alone physically, or two or more units can be integrated into one unit. The integrated unit may be implemented in a form of hardware or may be implemented in a form of a software functional unit.

When the foregoing integrated units are implemented in a form of a software functional unit, the integrated units may be stored in a computer-readable storage medium such as memory 1704 of FIG. 17. The software functional unit can be stored in a storage medium and includes several instructions for instructing a computer device or a processor to perform some or all of the steps of the method embodiments of the present disclosure. The computer device may be a personal computer, a server, or a network device. The foregoing storage medium can include any medium that can store program codes, such as a USB flash drive, a mobile hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

What is claimed is:

1. A method performed for monitoring a network connectivity status of an enrollee device, comprising:
   acquiring, by a configurator device, at least one channel, wherein the at least one channel comprises a target channel and at least one initial channel, and the configurator device is connected to the enrollee device and a network access device, the enrollee device being connected to a network through the network access device, wherein before acquiring the at least one channel, the method further comprises:
   sending, by the configurator device, a network configuration frame to the enrollee device, wherein the network configuration frame includes hotspot information for the enrollee device to connect to a hotspot;

sequentially switching between the target channel and the at least one initial channel to send, by the configurator device, a request packet to the enrollee device for querying a list of hotspots found by the enrollee device;

in response to the request packet, receiving, by the configurator device, a reply packet corresponding to the request packet from the enrollee device on the target channel through which the enrollee device connects to the hotspot; and acquiring, by the configurator device, network information of the enrollee device according to the reply packet returned by the enrollee device.

2. The method according to claim 1, further comprising:
sending, by the configurator device, the request packet to the enrollee device by using the at least one channel for querying whether the enrollee device is connected to one of the hotspots, wherein the reply packet returned by the enrollee device comprises at least one of:
identification information, network address information, routing information, domain name information, or network signal strength information associated with the one of the hotspots.

3. The method according to claim 1, further comprising:
sending, by the configurator device, the request packet to the enrollee device by using the at least one channel for querying information regarding a network failure that occurs after one of the hotspots is connected to the enrollee device, wherein the reply packet returned by the enrollee device comprises at least one of: a network connectivity status code or a reason code.

4. The method according to claim 1, wherein the reply packet returned by the enrollee device comprises at least: the list of hotspots found by the enrollee device, and access permission information, encryption type, or network signal strength information associated with one or more hotspots included in the list.

5. The method according to claim 1, wherein
the target channel is a channel used when the enrollee device is connected to the hotspot, and
the at least one initial channel is a connection channel for connecting the enrollee device to the network.

6. The method according to claim 1, wherein sending, by the configurator device, the request packet to the enrollee device by using the at least one channel comprises:
sending the request packet on each channel of the at least one channel sequentially; and
determining whether the reply packet is received, wherein,
in response to the reply packet being received over a channel of the at least one channel, stopping sending the request packet on any other channel of the at least one channel, or
in response to the reply packet not being received over the channel, continuing sending the request packet on an other channel of the at least one channel, and determining whether the reply packet is received over the other channel.

7. The method according to claim 1, further comprising:
receiving, by the configurator device, the reply packet on the initial channel.

8. The method according to claim 1, wherein,
the request packet comprises a request frame for requesting acquisition of network information of the enrollee device; and
the reply packet comprises a response frame that contains the network information of the enrollee device.

9. The method according to claim 1, wherein before sending, by the configurator device, the network configuration frame to the enrollee device, the method further comprises:
presetting the at least one initial channel.

10. The method according to claim 1, wherein, in response to the enrollee device failing to receive the network configuration frame, or the enrollee device failing to connect to the hotspot, the method further comprises:
receiving, by the configurator device, the reply packet on the initial channel.

11. A method for monitoring a network connectivity status of an enrollee device, comprising:
receiving, by the enrollee device, a request packet sent by a configurator device by sequentially switching between a target channel and at least one initial channel, for querying a list of hotspots found by the enrollee device, wherein the configurator device is connected to the enrollee device and a network access device, the enrollee device being connected to a network through the network access device;
receiving, by the enrollee device, a network configuration frame sent by the configurator device before the configurator device acquires the target channel and the at least one initial channel, wherein the network configuration frame includes hotspot information for the enrollee device to connect to a hotspot, and
in response to the request packet, returning, by the enrollee device, a reply packet to the configurator device on the target channel through which the enrollee device connects to the hotspot according to the request packet, wherein the reply packet comprises network information of the enrollee device.

12. The method according to claim 11, further comprising:
receiving, by the enrollee device, the request packet sent by the configurator device for querying whether the enrollee device is connected to one of the hotspots, wherein the reply packet returned by the enrollee device comprises at least one of: identification information, network address information, routing information, domain name information, or network signal strength information associated with the one of the hotspots.

13. The method according to claim 11, further comprising:
receiving, by the enrollee device, the request packet sent by the configurator device for querying information regarding a network failure that occurs after one of the hotspots is connected to the enrollee device, wherein the reply packet returned by the enrollee device comprises at least one of: a network connectivity status code or a reason code.

14. The method according to claim 11, wherein the reply packet returned by the enrollee device comprises at least one of: the list of hotspots found by the enrollee device, and access permission information, encryption type, or network signal strength information associated with one or more hotspots included in the list.

15. The method according to claim 11, wherein
the target channel is a channel used when the enrollee device is connected to the hotspot, and
the at least one initial channel is a connection channel for connecting the enrollee device to the network.

16. A configurator device for monitoring a network connectivity status of an enrollee device, comprising:

a first acquiring module having circuitry to acquire at least one channel, wherein the at least one channel comprises a target channel and at least one initial channel, and the configurator device is connected to the enrollee device and a network access device, the enrollee device being connected to a network through the network access device;

a first sending module having circuitry to send a request packet to the enrollee device by sequentially switching between the target channel and the at least one initial channel for querying a list of hotspots found by the enrollee device;

a first receiving module having circuitry to receive, in response to the request packet, a reply packet corresponding to the request packet from the enrollee device; and a second acquiring module having circuitry to acquire network information of the enrollee device according to the reply packet returned by the enrollee device;

wherein the configurator device is configured to send a network configuration frame to the enrollee device before the first acquiring module acquires the at least one channel, and configured to receive the reply packet on the target channel through which the enrollee device connects to a hotspot, wherein the network configuration frame includes hotspot information for the enrollee device to connect to the hotspot.

17. The configurator device according to claim 16, wherein the first sending module has circuitry to send the request packet to the enrollee device by using the at least one channel for querying whether the enrollee device is connected to one of the hotspots, and the reply packet returned by the enrollee device comprises at least one of:
identification information, network address information, routing information, domain name information, or network signal strength information associated with the one of the hotspots.

18. The configurator device according to claim 16, wherein the first sending module has circuitry to send the request packet to the enrollee device by using the at least one channel for querying information regarding a network failure that occurs after one of the hotspots is connected to the enrollee device, and the reply packet returned by the enrollee device comprises at least one of: a network connectivity status code or a reason code.

19. The configurator device according to claim 16, wherein the reply packet returned by the enrollee device comprises at least one of: a list of hotspots found by the enrollee device, and access permission information, encryption type, or network signal strength information associated with one or more hotspots included in the list.

20. The configurator device according to claim 16, wherein the target channel is a channel used when the enrollee device is connected to the hotspot, and
the initial channel is a connection channel for connecting the enrollee device to the network.

21. The configurator device according to claim 16, wherein
the request packet comprises a request frame for requesting acquisition of network information of the enrollee device; and
the reply packet comprises a response frame that contains the network information of the enrollee device.

22. A non-transitory computer readable medium that stores a set of instructions that is executable by at least one processor of a computer to cause the computer to perform a method for monitoring a network connectivity status of an enrollee device, the method comprising:
acquiring at least one channel by a configurator device, wherein the at least one channel comprises a target channel and at least one initial channel, and the configurator device is connected to the enrollee device and a network access device, the enrollee device being connected to a network through the network access device, wherein before acquiring the at least one channel, the method further comprises:
sending, by the configurator device, a network configuration frame to the enrollee device, wherein the network configuration frame includes hotspot information for the enrollee device to connect to a hotspot;
sequentially switching between the target channel and the at least one initial channel to send, by the configurator device, a request packet to the enrollee device for querying a list of hotspots found by the enrollee device;
in response to the request packet, receiving, by the configurator device, a reply packet corresponding to the request packet from the enrollee device on the target channel through which the enrollee device connects to the hotspot; and
acquiring, by the configurator device, network information of the enrollee device according to the reply packet returned by the enrollee device.

23. An apparatus, comprising:
a memory storing a set of computer-executable instructions; and
a processor configured to execute the set of computer-executable instructions to cause the apparatus to perform:
establishing at least one initial channel;
causing a request packet to be sent from a configurator device to an enrollee device by sequentially switching between a target channel and the at least one initial channel for querying a list of hotspots found by the enrollee device, wherein the configurator device is connected to the enrollee device and a network access device, the enrollee device being connected to a network through the network access device;
causing a network configuration frame to be sent from the configurator device to the enrollee device before the configurator device acquires the target channel and the at least one initial channel, wherein the network configuration frame includes hotspot information for the enrollee device to connect to a hotspot;
in response to the request packet, causing the configurator device to receive a reply packet on the target channel through which the enrollee device connects to the hotspot corresponding to the request packet from the enrollee device; and
causing the configurator device to acquire network information of the enrollee device according to the reply packet returned by the enrollee device.

* * * * *